US009140922B2

(12) United States Patent
Noguchi et al.

(10) Patent No.: US 9,140,922 B2
(45) Date of Patent: Sep. 22, 2015

(54) DISPLAY DEVICE AND ELECTRONIC UNIT

(75) Inventors: Kouji Noguchi, Kanagawa (JP); Koji Ishizaki, Aichi (JP); Takayuki Nakanishi, Aichi (JP); Takeya Takeuchi, Aichi (JP); Yasuyuki Teranishi, Aichi (JP)

(73) Assignee: Japan Display, Inc., Tokyo (JP)

( * ) Notice: Subject to any disclaimer, the term of this patent is extended or adjusted under 35 U.S.C. 154(b) by 579 days.

(21) Appl. No.: 12/771,759

(22) Filed: Apr. 30, 2010

(65) Prior Publication Data

US 2010/0289765 A1 Nov. 18, 2010

(30) Foreign Application Priority Data

May 18, 2009 (JP) ................................ 2009-120222

(51) Int. Cl.

| | |
|---|---|
| ***G06F 3/041*** | (2006.01) |
| ***G02F 1/1333*** | (2006.01) |
| ***G06F 3/044*** | (2006.01) |
| *G09G 3/36* | (2006.01) |

(52) U.S. Cl.

CPC ............ *G02F 1/13338* (2013.01); *G06F 3/044* (2013.01); *G06F 3/0412* (2013.01); *G09G 3/3614* (2013.01); *G09G 3/3648* (2013.01)

(58) Field of Classification Search

CPC .. G02F 1/13338; G06G 3/0412; G06G 3/044; G09G 3/3614; G09G 3/3648

USPC .................................................. 345/173–178

See application file for complete search history.

(56) References Cited

U.S. PATENT DOCUMENTS

| | | | | |
|---|---|---|---|---|
| 6,057,903 | A | 5/2000 | Colgan et al. | |
| 2005/0264506 | A1* | 12/2005 | Kim | 345/87 |
| 2007/0262966 | A1* | 11/2007 | Nishimura et al. | 345/173 |
| 2008/0062139 | A1* | 3/2008 | Hotelling et al. | 345/173 |
| 2009/0091549 | A1* | 4/2009 | Matsumoto et al. | 345/173 |

FOREIGN PATENT DOCUMENTS

| | | |
|---|---|---|
| JP | 2008-09750 | 1/2008 |

* cited by examiner

*Primary Examiner* — Christopher E Leiby

(74) *Attorney, Agent, or Firm* — Robert J. Depke; The Chicago Technology Law Group, LLC

(57) ABSTRACT

The display device with high detection accuracy includes: display pixel electrodes; a common electrode; a display function layer; a display control circuit performing image display control by applying a pixel voltage to each of the display pixel electrodes and applying a common drive voltage to the common electrode, the common drive voltage inverting in synchronization with a drive cycle of the image display control; a touch detection electrode cooperating with the common electrode to form a capacitor; and a touch detection circuit detecting an external proximity object, based on a detection signal obtained from the touch detection electrode in response to the common drive voltage applied to the common electrode. The touch detection circuit performs the detection operation in a inversion period following an inversion timing of the common drive voltage, based on both first and second detection signals obtained before and after the inversion timing, respectively.

14 Claims, 22 Drawing Sheets

| | DETECTION IN ΔtB | DETECTION IN ΔtA | DETECTION BY USING METHOD OF PRESENT EMBODIMENT |
|---|---|---|---|
| Vdet (DURING WHITE WRITING) | 1.00 | 1.00 | 1.00 |
| Vdet (DURING BLACK WRITING) | 1.50 | 1.20 | 1.01 |

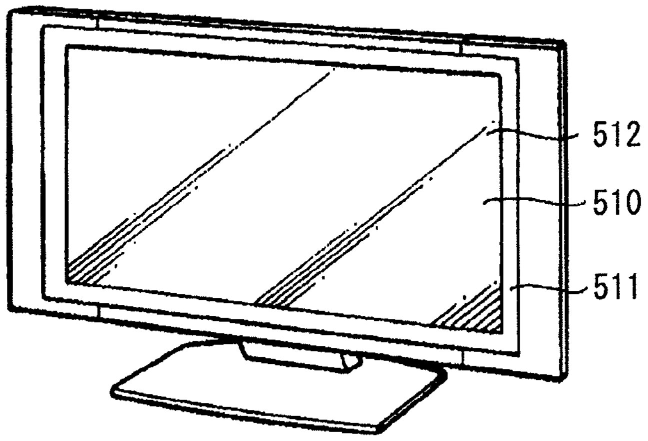
FIG. 24
FIG. 25A
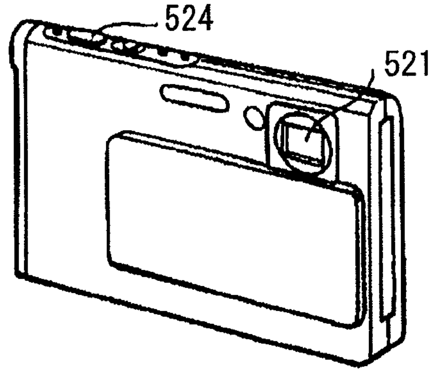
FIG. 25B
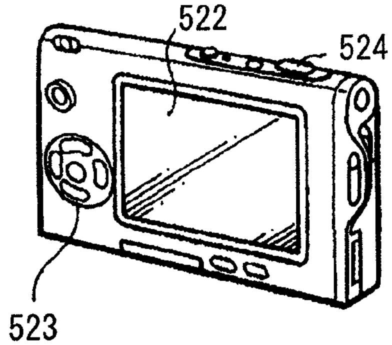

DISPLAY DEVICE AND ELECTRONIC UNIT

The present application claims priority to Japanese Patent Application JP 2009-120222 filed in the Japanese Patent Office on May 18, 2009, the entire content of which is hereby incorporated by reference.

BACKGROUND OF THE INVENTION

1. Field of the Invention

The present invention relates to a display device such as a liquid crystal display device, and particularly relates to a display device which includes a capacitance type touch sensor and into which information can be input with a touch by a user's finger or the like, and to an electronic unit having such a display device.

2. Description of the Related Art

In recent years, attention has been given to a display unit in which a contact detection device (hereinafter, referred to as a touch sensor) generally called a touch panel is directly mounted on a liquid crystal display device and causes the liquid crystal display device to display various buttons for input of information in stead of providing typical buttons. Amid a trend towards an increase in the size of a screen on a mobile device, this technique enables an arrangement common to a display and buttons, bringing about great advantages such as space savings and a reduction in the number of components. However, this technique has such a problem that the thickness of the entire liquid crystal module is increased because the touch sensor is mounted. In particular, when this technique is applied to a mobile device, it is necessary to provide a protection layer so as to prevent scratches on the touch panel and therefore, there is such a problem that the thickness of the liquid crystal module tends to be larger, going against a trend towards a reduction in thickness.

Japanese Unexamined Patent Application Publication No. 2008-9750 and U.S. Pat. No. 6,057,903 each propose a liquid crystal display element with a capacitance type touch panel, whose thickness is reduced. In this type, a conductive film for the touch panel is provided between a substrate on an observation side of the liquid crystal display element and a polarizing plate for observation arranged on an outer surface of the substrate on the observation side, and the capacitance type touch panel is formed between the conductive film for the touch panel and an outer surface of a polarizing plate so that this outer surface of the polarizing plate is used as a touch face.

SUMMARY OF THE INVENTION

However, in the liquid crystal display element with the touch panel disclosed in each of Japanese Unexamined Patent Application Publication No. 2008-9750 and U.S. Pat. No. 6,057,903, it is theoretically necessary for the conductive film for the touch panel to have an electric potential identical to that of a user, and it is necessary for the user to be properly grounded. Therefore, unlike application to stationary television receivers supplied with external power from outlets or the like, it is practically difficult to apply the liquid crystal display element with the touch panel to mobile devices. Moreover, in the technique described above, it is necessary to bring the conductive film for the touch panel extremely close to the user's finger and therefore, an area where the conductive film for the touch panel is to be disposed is restricted; for instance, it is difficult to dispose the conductive film for the touch panel in, for example, a portion deep inside the liquid crystal display element. In other words, flexibility in design is low. Moreover, in the technique described above, it is structurally necessary to provide circuit sections such as a touch panel drive section and a coordinate detection section independently of a display drive circuit section of the liquid crystal display element, making it difficult to integrate the circuits of the device as a whole.

It is conceivable that a touch detection electrode may be newly provided so that a capacitor is formed between the touch detection electrode and a common electrode that is originally provided to apply a drive voltage for display (a display device provided with a capacitance type touch sensor having a new configuration). This capacitor changes depending on the presence or absence of a touch by an object. Therefore, when the drive voltage for display applied to the common electrode by a display control circuit is also used as a drive signal for the touch sensor, a detection signal in accordance with the change of the capacitor is obtained from the touch detection electrode. When this detection signal is input into a predetermined touch detection circuit, it is possible to detect the presence or absence of the touch by the object. Further, according to this technique, it is possible to obtain a display device with a touch sensor suitable for application to mobile devices in which the potential of a user is often unsteady and also, it is possible to obtain a display device with a touch sensor designed in a highly flexible manner according to the type of a display function layer. Moreover, this technique provides such an advantage that a circuit for display and a circuit for the sensor are readily integrated on a single circuit board, making circuit integration easy.

However, in the display device with the capacitance type touch sensor like those described in Japanese Unexamined Patent Application Publication No. 2008-9750 and U.S. Pat. No. 6,057,903 as well as that according to the new configuration described above, there is such a problem that when a pixel signal (image signal) is written into a display element of each pixel, noise resulting from this writing operation is added to a detection signal.

Therefore, in U.S. Pat. No. 6,057,903, a transparent conductive layer (shield layer) is provided between the touch panel and the display element in order to prevent a malfunction (detection error) due to noise caused by an image-signal writing operation. By maintaining the conductive layer at a fixed potential, it is possible to shield the noise coming from the display element.

In this technique however, because a large capacitor is formed between a detection signal line and the shield layer, there is such a problem that a detection signal obtained from the detection signal line is greatly attenuated or the capacity of a drive line is largely increased, so that a power consumption and the like swells to a great extent.

Meanwhile, in the display device provided with the capacitance type touch sensor having the new configuration, since a position is detected by using a writing waveform in the display panel, it is conceivable that it may be difficult to remove or eliminate the noise resulting from the image-signal writing operation by providing a shield layer in an effective display area.

As described above, in the display device with the capacitance type touch sensor of the past, it is difficult to improve the accuracy of detecting an object by eliminating the noise resulting from the image-signal writing operation without using the shield layer.

In view of the foregoing, it is desirable to provide a display device that includes a capacitance type touch sensor and is capable of improving the accuracy of detecting an object without using a shield layer, and also to provide an electronic unit having such a display device.

According to an embodiment of the present invention, there is provided a display device that includes: a plurality of display pixel electrodes; a common electrode facing the display pixel electrodes; a display function layer having an image display function; a display control circuit performing image display control by applying a pixel voltage to each of the display pixel electrodes and applying a common drive voltage to the common electrode, the common drive voltage inverting in synchronization with a drive cycle of the image display control; a touch detection electrode cooperating with the common electrode to form a capacitor; and a touch detection circuit performing a detection operation of detecting an external proximity object, based on a detection signal obtained from the touch detection electrode in response to the common drive voltage applied to the common electrode, wherein the touch detection circuit performs the detection operation in a inversion period following an inversion timing of the common drive voltage, based on both a first detection signal obtained before the inversion timing and a second detection signal obtained after the inversion timing.

An electronic unit according to an embodiment of the present invention includes a display device with a touch sensor. The display device includes: a plurality of display pixel electrodes; a common electrode facing the display pixel electrodes; a display function layer having an image display function; a display control circuit performing image display control by applying a pixel voltage to each of the display pixel electrodes and applying a common drive voltage to the common electrode, the common drive voltage inverting in synchronization with a drive cycle of the image display control; a touch detection electrode cooperating with the common electrode to form a capacitor; and a touch detection circuit performing a detection operation of detecting an external proximity object, based on a detection signal obtained from the touch detection electrode in response to the common drive voltage applied to the common electrode, wherein the touch detection circuit performs the detection operation in a inversion period following an inversion timing of the common drive voltage, based on both a first detection signal obtained before the inversion timing and a second detection signal obtained after the inversion timing.

In these display device and electronic unit, the capacitor is formed between the common electrode that is originally provided to apply the common drive voltage and the touch detection electrode that is newly provided. This capacitor varies depending on the presence or absence of a touch by the object. Therefore, by using the common drive voltage, which is applied to the common electrode by the display control circuit, also as a touch sensor drive signal, the detection signal in accordance with the change of the capacitor is obtained from the touch detection electrode. By inputting the obtained detection signal into the touch detection circuit, the position touched by the object (a factor such as the presence or absence of the touch by the object) is detected. Here, the touch detection circuit performs the detection operation in the inversion period following the inversion timing of the common drive voltage inverting in synchronization with the drive cycle of the image display control, based on both the first detection signal obtained before the inversion timing and the second detection signal obtained after the inversion timing. Thus, it is possible to perform the detection operation in the inversion period following the inversion, while eliminating the effect of the noise (post-inversion noise), which is included in the detection signal following the inversion as a result of the operation of writing the image signal performed during the image display control before the inversion.

According to these display device and electronic unit, the position touched by the object is detected based on the detection signal obtained from the touch detection electrode according to the change of the capacitor, and the touch detection circuit performs the detection operation in the inversion period following the inversion timing of the common drive voltage, based on both the first detection signal obtained before the inversion timing and the second detection signal obtained after the inversion timing. Accordingly, it is possible to perform the detection operation in the inversion period following the inversion while eliminating the effect of the post-inversion noise, without using the existing shield layer. Therefore, it is possible to improve the accuracy of objection detection in the display device having the capacitance type touch sensor, without using the shield layer.

BRIEF DESCRIPTION OF THE DRAWINGS

FIG. 24 is a perspective external view of a display device according to Application example 1 of the above-described embodiments and the like, when viewed from the front.

FIGS. 25A and 25B are perspective external views of a display device according to Application example 2 of the above-described embodiments and the like, when viewed from the front and the back, respectively.

DETAILED DESCRIPTION OF THE PREFERRED EMBODIMENTS

Embodiments of the present invention will be described below in detail with reference to the drawings. Incidentally, the description will be provided in the following order.

Basic Principle of Touch Detection System

1. First embodiment (an example of post-inversion object detection using a detection value preceding an inversion of Vcom)

2. Second embodiment (an example using a liquid crystal element in a lateral-electric-field mode as a display element)

3. Modifications (Modifications 1 and 2: examples having other configurations of a common electrode and a detection-electrode-for-sensor)

4. Application examples (examples of application of a display device with a touch sensor to electronic unites)

[Basic Principle of Touch Detection System]

Figure 1A:
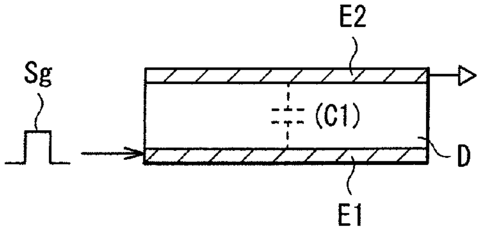
FIGS. 1A and 1B are diagrams for explaining an operational principle of a display device with a touch sensor according to an embodiment of the present invention, and illustrating a finger-untouched state.
Figure 1B:
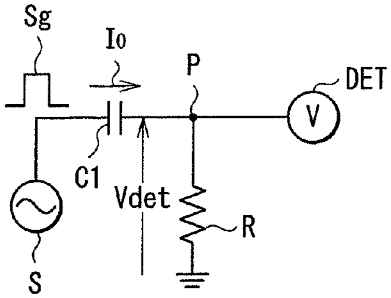

First, with reference to FIGS. 1A to 3, the basic principle of a touch detection system in a display device with a touch sensor according to the embodiments will be described. This touch detection system is realized as a capacitance type touch sensor. For example, as illustrated in FIG. 1A, a pair of electrodes (a drive electrode E1 and a detection electrode E2), which are disposed to face each other with a dielectric D interposed in between, are used to configure a capacitor element C1. This system is also illustrated in FIG. 1B as an equivalent circuit. The capacitor element C1 is configured by the drive electrode E1, the detection electrode E2, and the dielectric D. Of the capacitor element C1, one end is connected to an AC signal source (drive signal source) S, and the other end P is grounded through a resistance R and connected to a voltage detector (detection circuit) DET. When an AC rectangular wave Sg (Part (B) of FIG. 3) with a predetermined frequency (for example, approximately several kHz to ten-odd kHz) is applied from the AC signal source S to the drive electrode E1 (the one end of the capacitor element C1), an output waveform (detection signal Vdet) as illustrated in Part (A) of FIG. 3 appears in the detection electrode E2 (the other end P of the capacitor element C1). Incidentally, this AC rectangular wave Sg corresponds to a common drive signal Vcom, which will be described later.

In a finger-untouched state, as illustrated in FIGS. 1A and 1B, when charge/discharge is performed on the capacitor element C1, a current I0 in accordance with a capacity value of the capacitor element C1 flows. At this moment, the waveform of an electric potential of the other end P in the capacitor element C1 is like, for example, a waveform V0 in Part (A) of FIG. 3, and this is detected by the voltage detector DET.

Figure 2A:
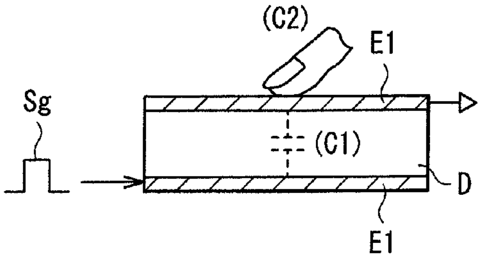
FIGS. 2A and 2B are diagrams for explaining the operational principle of the display device with the touch sensor according to the embodiment of the present invention, and illustrating a finger-touched state.
Figure 2B:
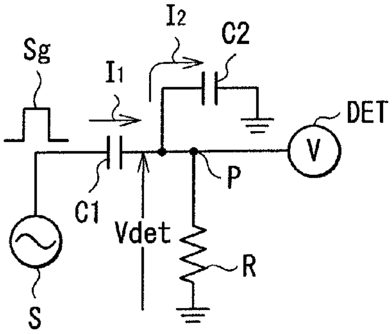
Figure 3:
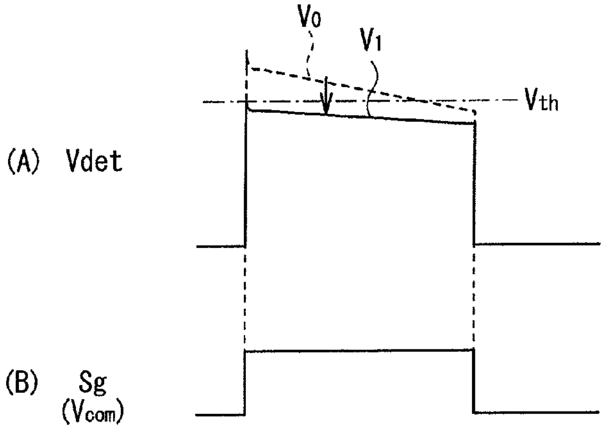
FIG. 3 is a diagram for explaining the operational principle of the display device with the touch sensor according to the embodiment of the present invention, and illustrating an example of a waveform of a drive signal and an example of a waveform of a detection signal of the touch sensor.

On the other hand, in a finger-touched state, as illustrated in FIGS. 2A and 2B, a capacitor element C2 formed by a finger is added in series to the capacitor element C1. In this state, when charge/discharge is performed on the capacitor elements C1 and C2, currents I1 and I2 flow, respectively. At this moment, the waveform of an electric potential of the other end P in the capacitor element C1 is like, for example, a waveform V1 in Part (A) of FIG. 3, and this is detected by the voltage detector DET. At this time, the electric potential at the other end P is a divided electric potential defined by the values of the currents I1 and I2 flowing through the capacitor elements C1 and C2, respectively. Therefore, the waveform V1 becomes a value smaller than that of the waveform V0 in the untouched state. As will be described later, the voltage detector DET compares the detected voltage with a predetermined threshold voltage Vth. When the detected voltage is equal to or larger than the threshold voltage Vth, the voltage detector DET determines that it is in the untouched state. On the other hand, when the detected voltage is smaller than the threshold voltage Vth, the detector DET determines that it is in the touched state. In this manner, it is possible to perform the touch detection.

[1. First Embodiment]

[Configurational Example of a Display Device 1]

Figure 4:
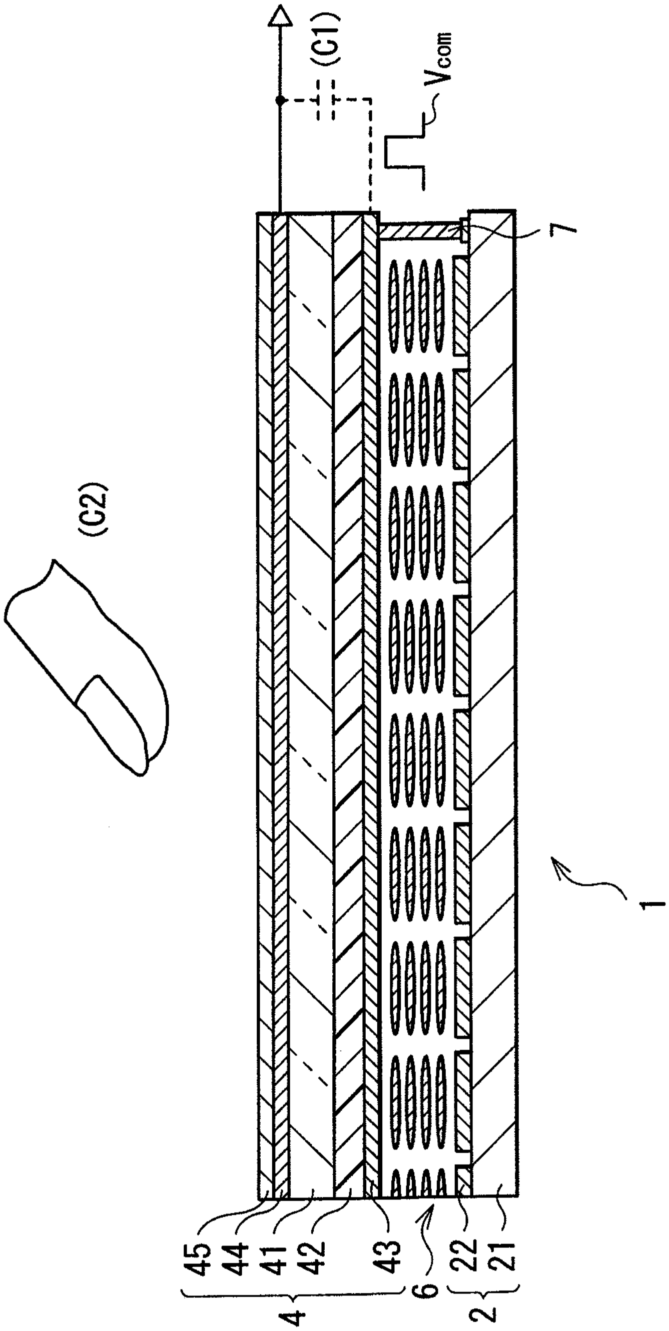
FIG. 4 is a cross-sectional diagram that schematically illustrates a configuration of a display device with a touch sensor according to a first embodiment of the present invention.

FIG. 4 illustrates a cross sectional configuration of a main part of the display device 1 with a touch sensor according to a first embodiment of the present invention. In the display device 1, a liquid crystal display element is used as a display element, a part of an electrode (a common electrode 43, which will be described later) that is originally provided in this liquid crystal display element and a drive signal for display (common drive signal Vcom, which will be described later) are used, thereby a capacitance type touch sensor is configured.

As illustrated in FIG. 4, the display device 1 includes a pixel substrate 2, an opposed substrate 4 facing the pixel substrate 2, and a liquid crystal layer 6 inserted between the pixel substrate 2 and the opposed substrate 4.

The pixel substrate 2 includes a TFT (thin film transistor) substrate 21 serving as a circuit substrate and a plurality of pixel electrodes 22 disposed in a matrix form on the TFT substrate 21. In addition to a display driver and TFTs, which are not illustrated, for driving each of the pixel electrodes 22, wirings such as a source line that supplies a pixel signal to each of the pixel electrodes 22 and a gate line that drives each of the TFTs are formed in the TFT substrate 21. Moreover, in the TFT substrate 21, a detection circuit 8 (FIG. 6) that performs touch detection operation, which will be described later, may also be formed.

The opposed substrate 4 includes a glass substrate 41, a color filter 42 formed on one surface of this glass substrate 41, and a common electrode 43 formed on this color filter 42. In the color filter 42, for example, color filter layers of three colors, red (R), green (G), and blue (B) are aligned in a cycle, and a set of three colors of R, G and B is assigned to each display pixel (pixel electrode 22). The common electrode 43 is also used as a detection-electrode-for-sensor forming a part of the touch sensor performing the touch detection operation, and corresponds to the drive electrode E1 in FIG. 1A.

The common electrode 43 is coupled to the TFT substrate 21 with a contact conductive pillar 7. The common drive signal Vcom (i.e., a common drive voltage) having an AC rectangular waveform is applied from the TFT substrate 21 to the common electrode 43 through the contact conductive pillar 7. The common drive signal Vcom defines the pixel voltage applied to the pixel electrode 22 as well as a display voltage of each of the pixels, and is also used as the drive signal for the touch sensor. The common drive signal Vcom corresponds to the AC rectangular wave Sg supplied from the drive signal source S in FIGS. 1A and 1B. In other words, the common drive signal Vcom inverts at every predetermined cycle.

On the other surface of the glass substrate 41, a detection-electrode-for-sensor 44 (touch detection electrode) is formed. Moreover, on this detection-electrode-for-sensor 44, a polarizing plate 45 is disposed. The detection-electrode-for-sensor 44 forms a part of the touch sensor, and corresponds to the detection electrode E2 in FIG. 1A.

The liquid crystal layer 6 modulates light passing through the liquid crystal layer 6, in accordance with the state of the electric field, and is configured of a liquid crystal in any of various modes such as TN (twisted nematic), VA (vertical alignment), and ECB (electrically controlled birefringence).

Alignment films are respectively disposed between the liquid crystal layer 6 and the pixel substrate 2 and between the liquid crystal layer 6 and the opposed substrate 4. Although a polarizing plate on a light incident side is disposed below the pixel substrate 2, its illustration is omitted in the figure.

Figure 5:
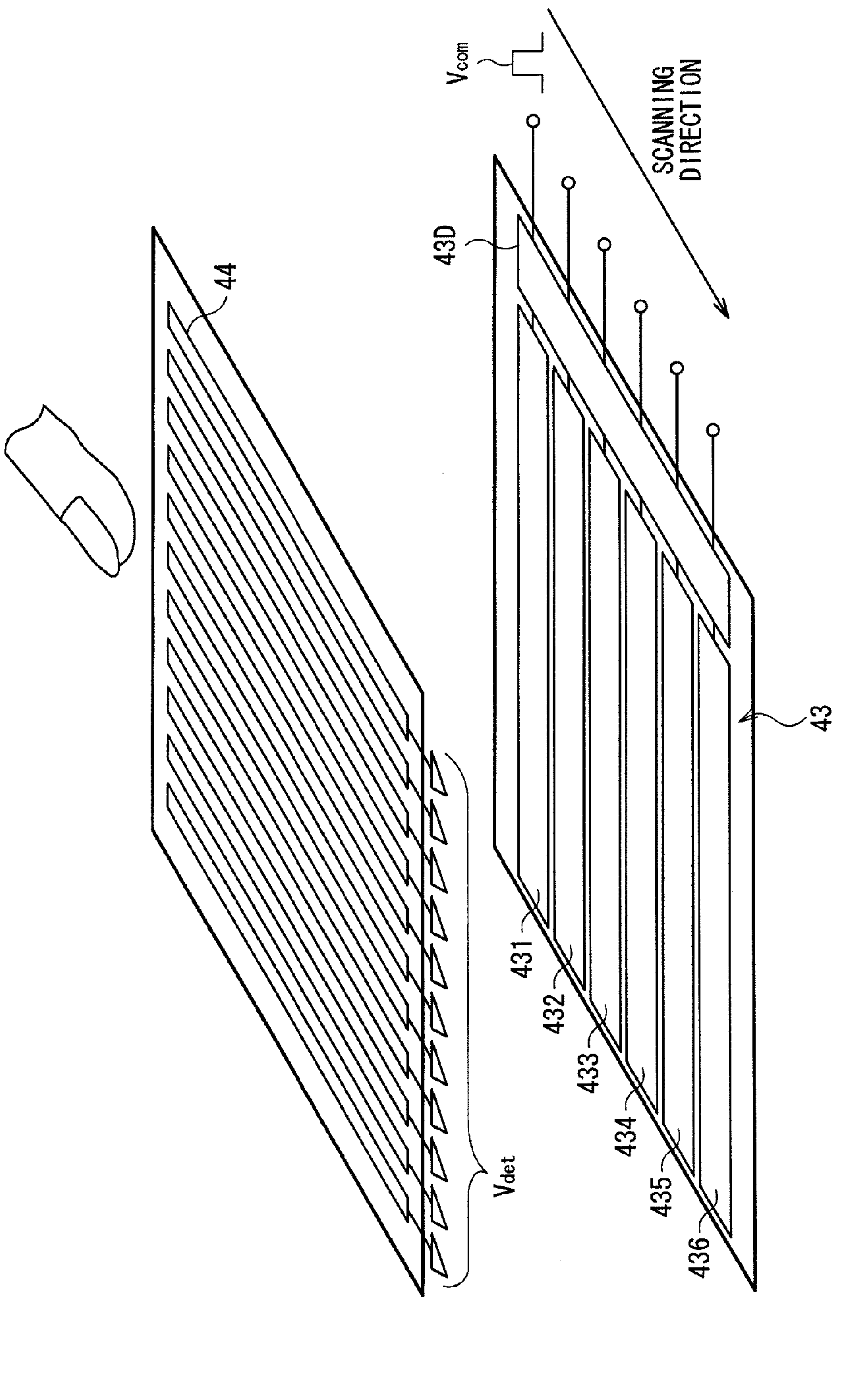
FIG. 5 is a perspective diagram that illustrates a configurational example of a main part (a common electrode and a detection-electrode-for-sensor) of the display device illustrated in FIG. 4.

FIG. 5 is a perspective diagram that illustrates a configurational example of the common electrode 43 and the detection-electrode-for-sensor 44 in the opposed substrate 4. In this example, the common electrode 43 is divided into a plurality of stripe-shaped electrode patterns (here, six common electrodes 431 through 436 are taken as an example) extending in the right-and-left direction of the figure. With a driver 43D, the common drive signal Vcom is sequentially supplied to each of the electrode patterns, and line-sequential scanning driving is time-divisionally performed as will be described later. On the other hand, the detection-electrode-for-sensor 44 includes a plurality of stripe-shaped electrode patterns extending in a direction orthogonal to the extending direction of the electrode patterns in the common electrode 43. The detection signal Vdet is output from each of the electrode patterns in the detection-electrode-for-sensor 44, and input into the detection circuit 8 illustrated in FIG. 6.

[Example of the Circuit Configuration Including the Drive Signal Source S and the Detection Circuit 8]

Figure 6:
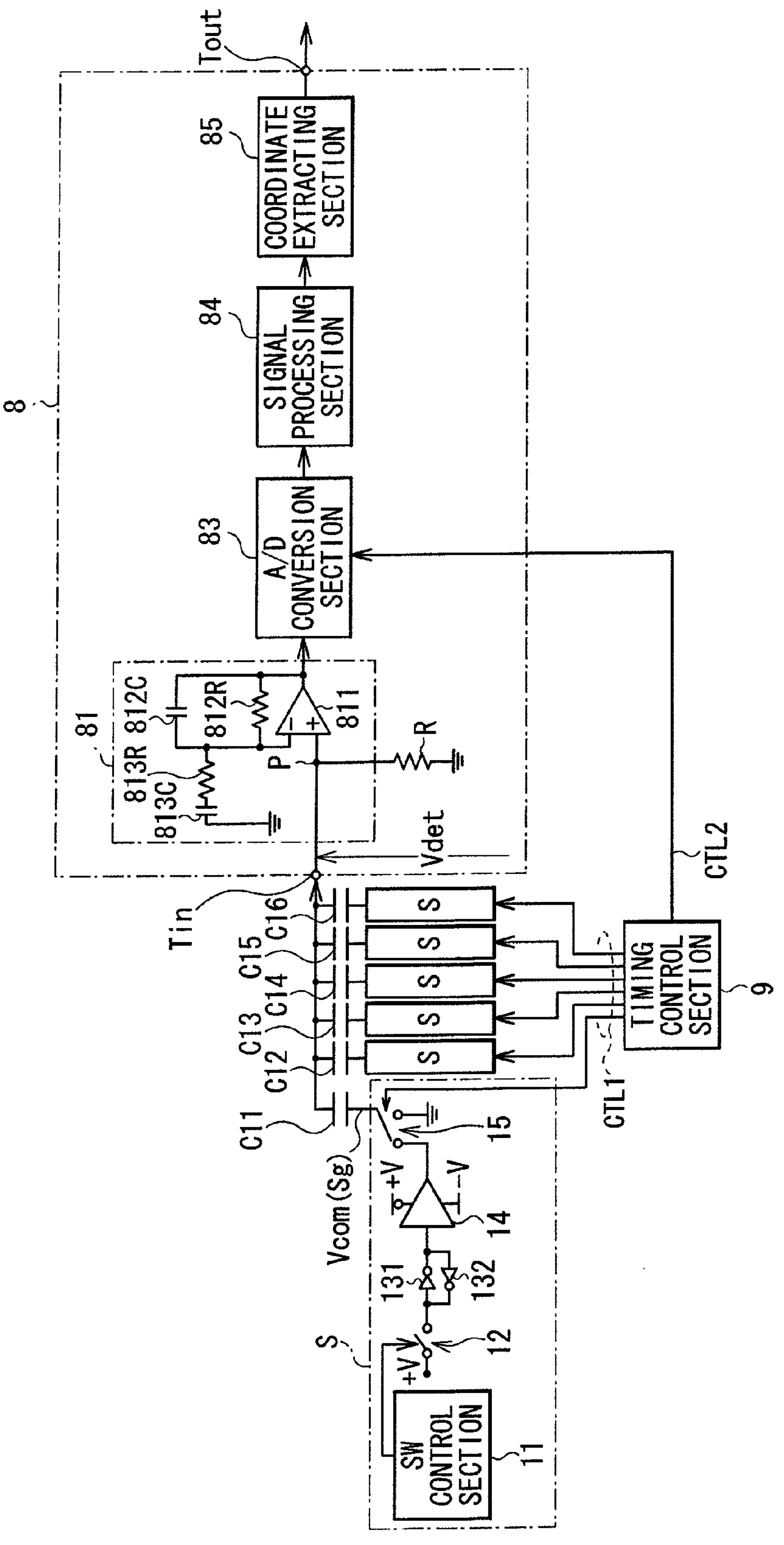
FIG. 6 is a circuit diagram that illustrates a configurational example of a detection circuit etc. in the display device illustrated in FIG. 4.

FIG. 6 illustrates an example of the circuit configuration including the drive signal source S illustrated in FIG. 1B and the detection circuit 8, together with a timing control section 9 serving as a timing generator. Capacitor elements C11 through C16 illustrated in FIG. 6 respectively correspond to (electrostatic) capacitor elements formed between the common electrodes 431 through 436 illustrated in FIG. 5 and the detection-electrode-for-sensor 44.

The drive signal source S is provided for each of the capacitor elements C11 through C16, and includes a SW control section 11, two switching elements 12 and 15, two inverter circuits 131 and 132, and an operational amplifier 14. The SW control section 11 controls on and off states of the switching element 12, thereby controlling the state of connection between a power source +V and the inverter circuits 131 and 132. An input terminal of the inverter circuit 131 is connected to one end of the switching element 12 (a terminal opposite the power source +V) and an output terminal of the inverter circuit 132. An output terminal of the inverter circuit 131 is connected to an input terminal of the inverter circuit 132 and an input terminal of the operational amplifier 14. Thus, the inverter circuits 131 and 132 function as an oscillation circuit that outputs a predetermined pulse signal. The operational amplifier 14 is connected to two power sources +V and −V. According to a timing control signal CTL1 supplied by the timing control section 9, on and off states of the switching element 15 is controlled. Specifically, with the switching element 15, one end (on the common electrodes 431 through 436 side) of each of the capacitor elements C11 through C16 is connected to an output terminal of the operational amplifier 14 or a ground. Thus, the common drive signal Vcom is supplied from the drive signal source S to the capacitor elements C11 through C16.

The detection circuit 8 (voltage detector DET) includes an amplifying section 81, an A/D (analog to digital) conversion section 83, a signal processing section 84, a coordinate extracting section 85, and the resistance R mentioned earlier. Incidentally, an input terminal Tin of the detection circuit 8 is connected to and shared by the other end (on the detection-electrode-for-sensor 44 side) of each of the capacitor elements C11 through C16.

The amplifying section 81 amplifies the detection signal Vdet input from the input terminal Tin, and includes an operational amplifier 811 that amplifies a signal, two resistances 812R and 813R, and two capacitors 812C and 813C. A positive input terminal (+) of the operational amplifier 811 is connected to the input terminal Tin, and an output terminal of the operational amplifier 811 is connected to an input terminal of the A/D conversion section 83 which will be described later. One end of each of the resistance 812R and the capacitor 812C is connected to an output terminal of the operational amplifier 811, while the other end of each of the resistance 812R and the capacitor 812C is connected to a negative input terminal (−) of the operational amplifier 811. Further, one end of the resistance 813R is connected to the other end of each of the resistance 812R and the capacitor 812C, while the other end of the resistance 813R is connected to a ground via the capacitor 813C. Thus, the resistance 812R and the capacitor 812C function as a low-pass filter (LPF) that cuts a high-frequency component and allows a low-frequency component to pass, and the resistance 813R and the capacitor 813C function as a high-pass filter (HPF) that allows the high-frequency component to pass.

The resistance R is arranged between a connection point P on a side where the positive input terminal (+) of the operational amplifier 811 is provided and a ground. The resistance R maintains a stable state by avoiding floating of the detection-electrode-for-sensor 44. This provides such an advantage that in the detection circuit 8, instability or fluctuation of the signal value of the detection signal Vdet is avoided and at the same time, static electricity is dissipated to the ground via the resistance R.

The A/D conversion section 83 converts the detection signal Vdet, in analog form, amplified in the amplifying section 81, into a digital detection signal, and includes a comparator not illustrated. The comparator compares the electric potential of the input detection signal to that of the predetermined threshold voltage Vth (see FIG. 3). Incidentally, sampling timing at the time of A/D conversion in the A/D conversion section 83 is controlled by a timing control signal CTL2 supplied by the timing control section 9.

The signal processing section 84 applies predetermined signal processing (for example, processing for digitally eliminating noise, and processing for converting frequency information into position information) to the digital detection signal output from the A/D conversion section 83. The signal processing section 84 also performs predetermined arithmetic processing for eliminating an effect of noise (post-inversion noise) caused by an image-signal writing operation, which will be described in detail later.

The coordinate extracting section 85 obtains a detection result (whether there is a touch or not, and coordinates of a touched position when there is the touch) based on the detection signal (detection signal after elimination of the post-inversion noise) output from the signal processing section 84, and outputs the detection result from an output terminal Tout.

Incidentally, the detection circuit 8 thus configured, may be formed in a peripheral region (a non-display region or frame region) on the opposed substrate 4. Alternatively, the detection circuit 8 may be formed in a peripheral region on the pixel substrate 2. However, when the detection circuit 8 is formed on the pixel substrate 2, the detection circuit 8 and various circuit elements for display control or the like originally formed on the pixel substrate 2 are integrated, and this is preferable from the viewpoint of simplification of the circuit realized by the integration. In this case, each of the electrode patterns in the detection-electrode-for-sensor 44 and the detection circuit 8 on the pixel substrate 2 are connected with a contact conductive pillar (not illustrated in the figure) similar to the contact conductive pillar 7, and the detection signal Vdet may be transmitted from the detection-electrode-for-sensor 44 to the detection circuit 8.

[Operation and Effect of the Display Device 1]

Now, the operation and effect of the display device 1 will be described.

(Basic Operation)

In the display device 1, a display driver (not illustrated in the figure) of the pixel substrate 2 line-sequentially supplies the common drive signal Vcom to each of the electrode patterns (such as the common electrodes 431 through 436) in the common electrode 43. The display driver also supplies the pixel signal (image signal) to the pixel electrode 22 through the source line, and line-sequentially controls switching of the TFT in each of the pixel electrodes through the gate line, in synchronization with this supply of the pixel signal. Thereby, the electric field is applied to the liquid crystal layer 6 for each pixel, in the longitudinal direction (direction perpendicular to the substrate) defined by the common drive signal Vcom and each of the pixel signals, and the liquid crystal state is modulated. In this manner, the display is performed with so-called inversion driving.

On the other hand, on the opposed substrate 4 side, the capacitor element C1 (the capacitor elements C11 through C16) is formed at each intersection portion of each of the electrode patterns in the common electrode 43 and each of the electrode patterns in the detection-electrode-for-sensor 44. Here, for example, as illustrated in Part (A) through Part (C) of FIG. 7, when the common drive signal Vcom is time-divisionally sequentially applied to each of the electrode patterns in the common electrode 43, the charge/discharge is performed on each of the capacitor elements C11 through C16 of one line formed at the intersection portion of the electrode pattern in the common electrode 43, to which the common drive signal Vcom is applied, and each of the electrode patterns in the detection-electrode-for-sensor 44. As a result, the detection signal Vdet with the magnitude in accordance with the capacity of the capacitor element C1 is output from each of the electrode patterns in the detection-electrode-for-sensor 44. In a state in which the user's finger is not in contact with the surface of the opposed substrate 4, the magnitude of this detection signal Vdet is approximately constant. A line of the capacitor elements C1 to be charged/discharged is line-sequentially shifted by the scanning with the common drive signal Vcom.

Figure 7:
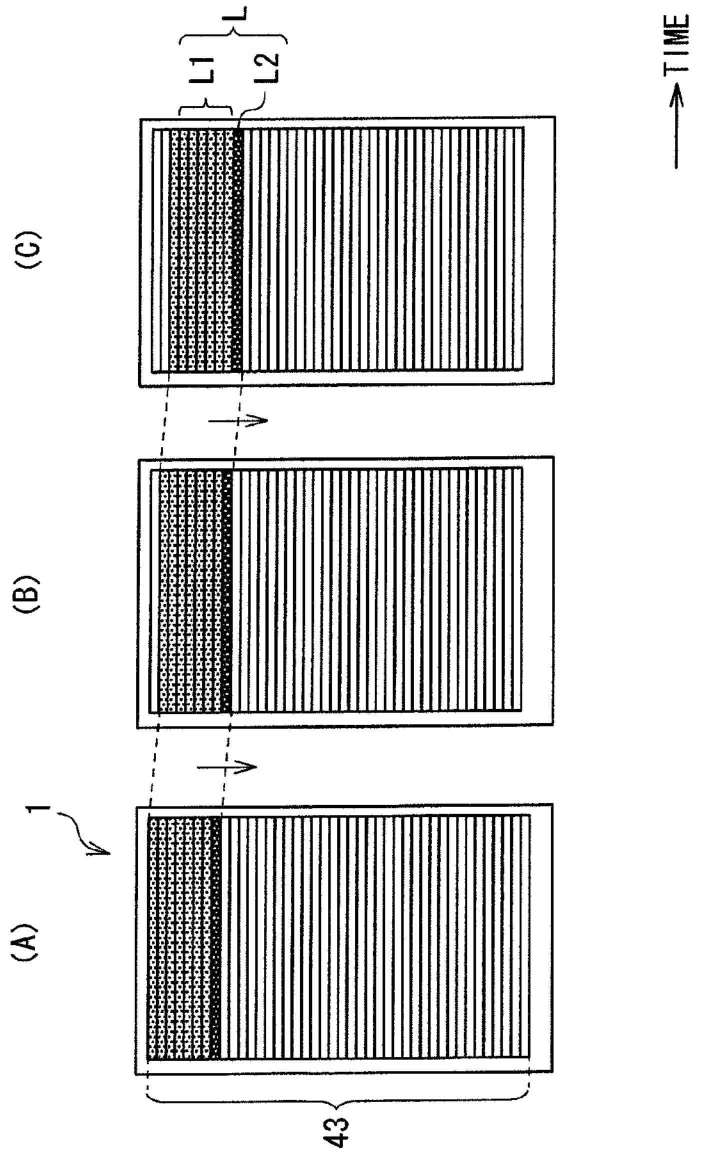
FIG. 7 is a schematic diagram that illustrates an example of line-sequential operation driving of the common electrode.

Incidentally, when each of the electrode patterns in the common electrode 43 is line-sequentially driven as described above, it is preferable to perform the line-sequential driving operation by binding a part of the electrode patterns in the common electrode 43, as illustrated in FIG. 7. To be more specific, a driving line L configured of this part of the electrode patterns includes a detection driving line L1 configured of plural lines of the electrode patterns and a display driving line L2 made of a few lines (here, one line) of the electrode patterns. This makes it possible to suppress deterioration of image quality due to appearance of lines and spots in accordance with the shapes of the electrode patterns in the common electrode 43.

Here, when the user's finger touches any place on the surface of the opposed substrate 4, the capacitor element C2 by the finger is added to the capacitor element C1, which is originally formed in the touched place. As a result, the value of the detection signal Vdet at the time when that touched place is scanned (i.e. when the common drive signal Vcom is applied to the electrode pattern corresponding to that touched place, among the electrode patterns of the common electrode 43) becomes smaller than the detection signals Vdet of other places. The detection circuit 8 (FIG. 6) compares this detection signal Vdet with the threshold voltage Vth. When the detection signal Vdet is smaller than the threshold voltage Vth, the detection circuit 8 determines that place as the touched place. This touched place can be determined based on the timing for applying the common drive signal Vcom, and the timing for detecting the detection signal Vdet which is smaller than the threshold voltage Vth.

In this manner, in the display device 1 with the touch sensor according to the present embodiment, the common electrode 43, which is originally provided in the liquid crystal display element, is also used as one of the pair of electrodes (the drive electrode and the detection electrode) for the touch sensor. In addition, the common drive signal Vcom serving as the display drive signal is also used as the drive signal for the touch sensor. Thus, in the capacitance type touch sensor, only the detection-electrode-for-sensor 44 is provided as a newly-provided electrode, and it is unnecessary to newly provide a drive signal for the touch sensor. Therefore, the configuration is simple.

Also, in the display device with the touch panel of the related art (Japanese Unexamined Patent Application Publication No. 2008-9750), the magnitude of a current flowing through a sensor is accurately measured, and a touched position is determined through analogue computation, based on that measured value. On the other hand, in the display device 1 according to the present embodiment, the present or absence of the relative change in the current (change of the electric potential) in accordance with the presence or absence of the touch is digitally detected and thus, it is possible to improve the detection accuracy with the simple configuration of the detection circuit. Moreover, the capacitor is formed between the common electrode 43, which is originally provided for the application of the common drive signal Vcom, and the detection-electrode-for-sensor 44, which is newly provided, and the touch detection is performed by utilizing the change of this capacitor resulting from the touch by the finger of the user. Thus, the display device with the touch panel of the present embodiment can be applied to a mobile device in which the electric potential of a user is often unsteady.

Further, since the detection-electrode-for-sensor 44 is divided into the plurality of electrode patterns, and each of the plurality of electrode patterns is individually time-divisionally driven, the touched position can be detected.

(Operation of Featuring Part; Detection Operation Using Noise Eliminating Processing)

Next, with reference to FIG. 8 through FIG. 15, the detection operation using the noise eliminating processing, which is one of the features of the present embodiment, will be described in detail.

Figure 8:
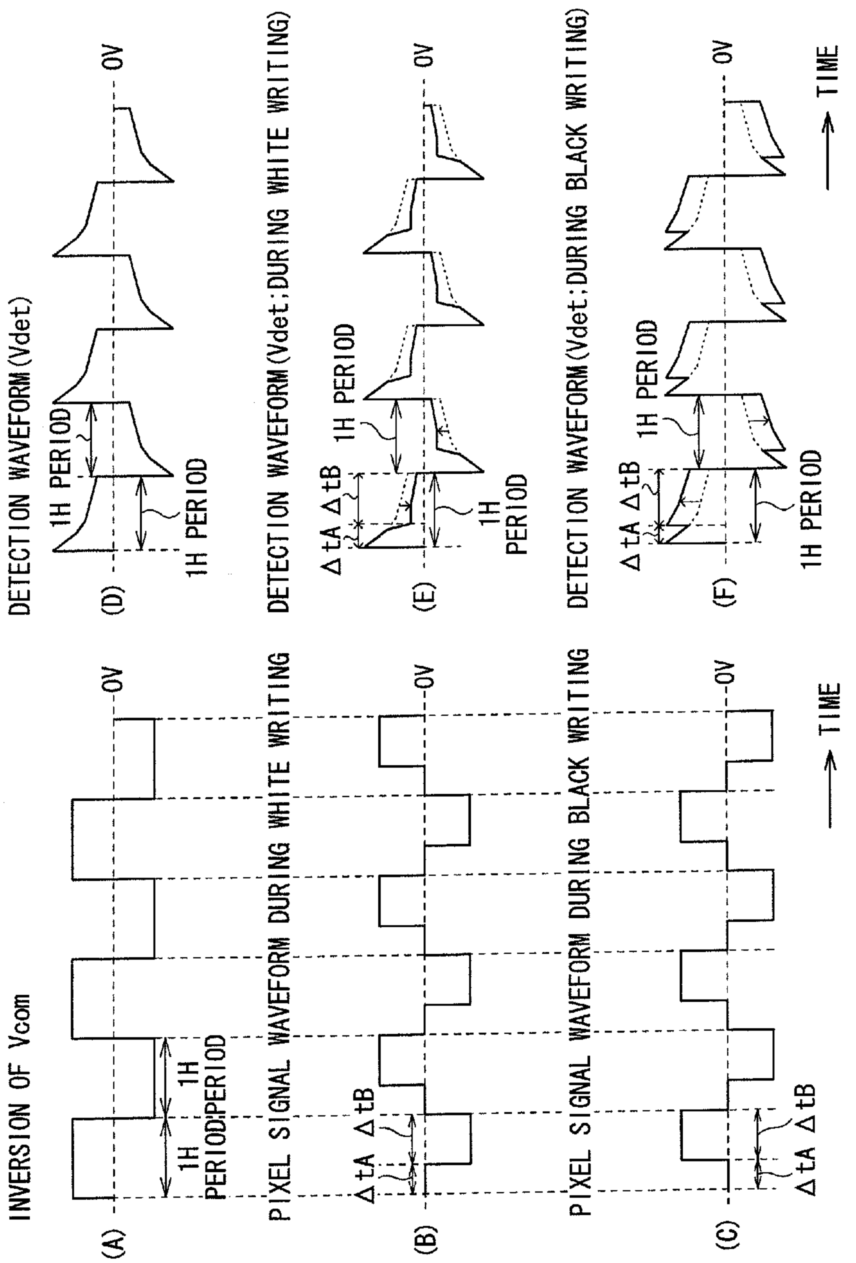
FIG. 8 is a timing-waveform diagram for explaining noise caused by an image-signal writing operation performed at the time of detection operation in the display device.

First, as illustrated in Part (A) of FIG. 8, when the common drive signal Vcom undergoes an inversion in synchronization with a driving cycle (1H period of image signal) used during image display control like those illustrated in Parts (B) and (C) of FIG. 8, the detection waveform of the detection signal Vdet results as illustrated in Parts (D) through (F) of FIG. 8. In other words, the detection signal Vdet inverts in synchronization with the above-mentioned inversion, and the signal value gradually attenuates after inverting due to a leakage current flowing into the resistance R described above. Incidentally, for convenience of the description, the detection waveforms in FIG. 8 (Parts (D) through (F)) are illustrated on assumption that an effect of post-inversion noise has been removed or eliminated.

At this moment, when pixel-signal (image-signal) writing such as white writing and black writing as illustrated in Part (B) and Part (C) of FIG. 8 is performed, noise resulting from this writing is included in the detection waveform of the detection signal Vdet as illustrated, for example, in Part (E) and Part (F) of FIG. 8. Specifically, the 1H period includes a non-writing period ΔtA during which the image signal is not applied and a writing period ΔtB during which the image signal is applied, and a change of the detection waveform occurs during the writing period ΔtB according to a tone level of the pixel signal. In other words, according to the tone level of the (post-inversion) image signal at that moment, the post-inversion noise caused by the post-inversion image signal, as indicated by arrows in Part (E) and Part (F) of FIG. 8, is included in the detection waveform of the detection signal Vdet. To be more specific, the post-inversion noise in phase with the common drive signal Vcom is included at the time of black writing, whereas the post-inversion noise in opposite phase with the common drive signal Vcom is included at the time of write writing. In this way, during the writing period ΔtB, the detection waveform of the detection signal Vdet changes according to the tone level of the pixel signal due to the post-inversion noise and thus, it is difficult to distinguish such a change from the change (Part (A) of FIG. 3) in the detection waveform caused by a factor such as the presence or absence of the touch by the object.

Figure 9:
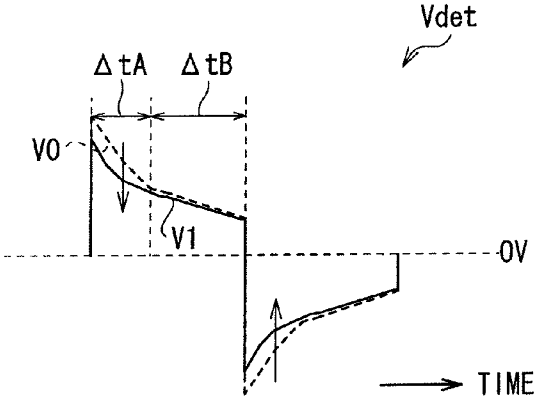
FIG. 9 is a timing-waveform diagram for explaining the relationship between a detection signal waveform and a detection period.

Meanwhile, for example, as illustrated in FIG. 9, during the non-writing period ΔtA that corresponds to the time immediately after the common drive signal Vcom inverts, the amount of a voltage change due to the touch by the object is extremely large as compared to that in the writing period ΔtB. Therefore, from the viewpoint of removing the component of the change in the detection waveform caused by the factor such as the presence or absence of the touch by the object and isolating this component from the noise eliminating processing, it is preferable that the A/D conversion section 83 in the detection circuit 8 obtain the detection signal preceding the inversion, which will be described later, at the time immediately after this inversion. Further, considering that a detection sensitivity to the factor such as the presence or absence of the touch by the object is high and an effect of the post-inversion noise which will be described later is small, it is desirable that the detection operation following the inversion, which will be described later, be performed at the time (non-writing period ΔtA) before beginning of the operation of writing the image signal which is performed after that inversion.

Figure 10:
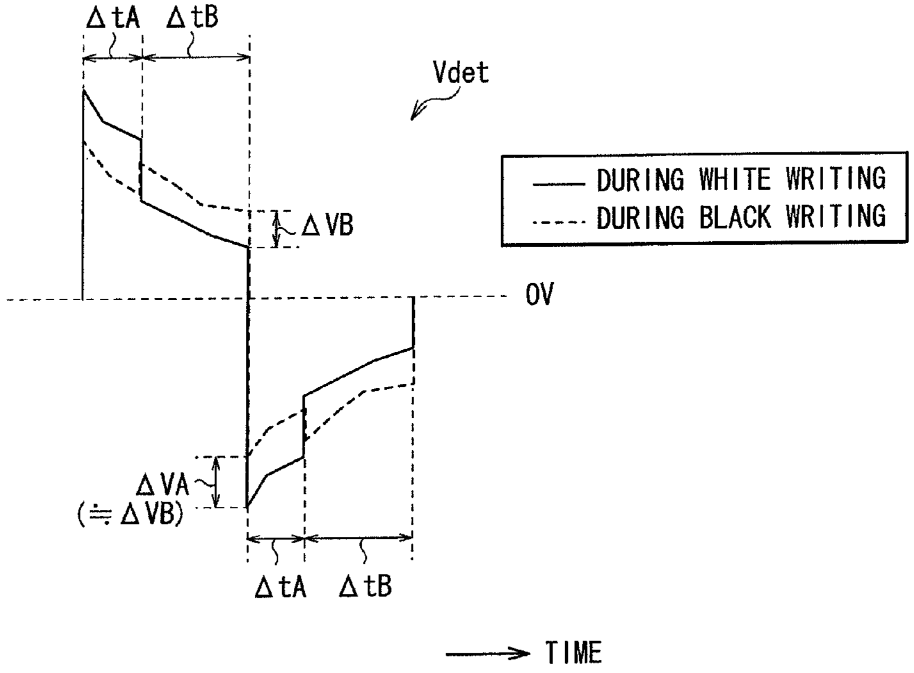
FIG. 10 is a timing-waveform diagram that illustrates an example of each of a detection signal waveform in white writing and a detection signal waveform in black writing, in the times before and after a common driving signal inverts.

Here, in fact, as illustrated in FIG. 10, the noise caused by the image signal included in the detection signal preceding the inversion (i.e. pre-inversion noise; corresponding to an electric potential difference ΔVB in the figure) also results as the post-inversion noise during the non-writing period ΔtA in the detection signal after the inversion. In other words, according the magnitude of the electric potential difference ΔVB corresponding to the pre-inversion noise (i.e. an electric potential according to the tone level of the pixel signal preceding the inversion), the magnitude of an electric potential difference ΔVA corresponding to the post-inversion noise is defined. Theoretically, the electric potential difference ΔVA is equal to the electric potential difference ΔVB, and the amount of the change at the time of the inversion remains constant. However, it often happens that writing noise equal to or larger than a theoretical value is included before the inversion, as a result of a waveform delay that occurs due to a delay of the detection signal Vdet or addition of a noise filter or the like (not illustrated). For this reason, there is a case where the electric potential difference ΔVA is not equal to the electric potential difference ΔVB, and it is necessary to perform processing using an equation such as ΔVA=f(ΔVB) or a reference table etc.

Figure 11:
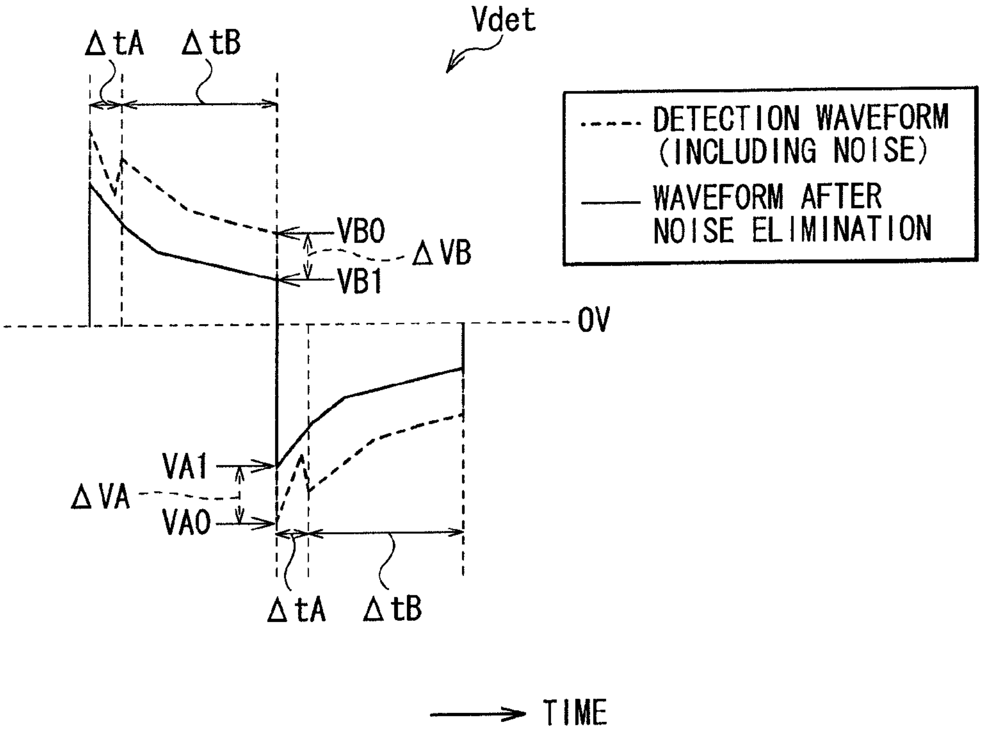
FIG. 11 is a timing-waveform diagram that illustrates an example of each of a detection signal waveform including the noise and a detection signal waveform succeeding elimination of the noise, in the times before and after a common driving signal inverts.

Therefore, in the present embodiment, for example, as illustrated in FIG. 11, the objection detection in which the above-described noise is eliminated is performed in the signal processing section 84 and the coordinate extracting section 85 within the detection circuit 8. Specifically, in the detection circuit 8, before and after the inversion of the common drive signal Vcom, the detection operation following the inversion is performed using the detection signal Vdet preceding the inversion. More specifically, the signal processing section 84 obtains, based on the detection signal Vdet preceding the inversion, a noise-eliminated signal (i.e., a noise-eliminated detection signal) in which there is removed or eliminated the post-inversion noise, which is included in the detection signal Vdet succeeding the inversion, as a result of the operation of writing the image signal which is performed before that inversion. Subsequently, the coordinate extracting section 85 performs the detection operation following the inversion, by using the noise-eliminated signal.

Hence, it is possible to perform the detection operation in the inversion period following the inversion, while eliminating the effect of the noise (post-inversion noise), which is included in the detection signal Vdet following the inversion as a result of the operation of writing the image signal which is performed before the inversion.

Here, as illustrated in FIG. 11, there are defined: electric potentials VB0 and VB1 in the detection signal Vdet preceding the inversion (i.e., a first detection signal), which are electric potentials before and after noise elimination, respectively; electric potentials VA0 and VA1 in the detection signal Vdet following the inversion (i.e. a second detection signal), which are electric potentials before and after the noise elimination, respectively; and the above-mentioned electric potential differences ΔVB and ΔVA. Then, the detection circuit 8 can perform the objection detection in which the noise is eliminated, by using, for example, methods (Method 1 through Method 3) as illustrated FIG. 12 through FIG. 14.

(Method 1)

Figure 12:
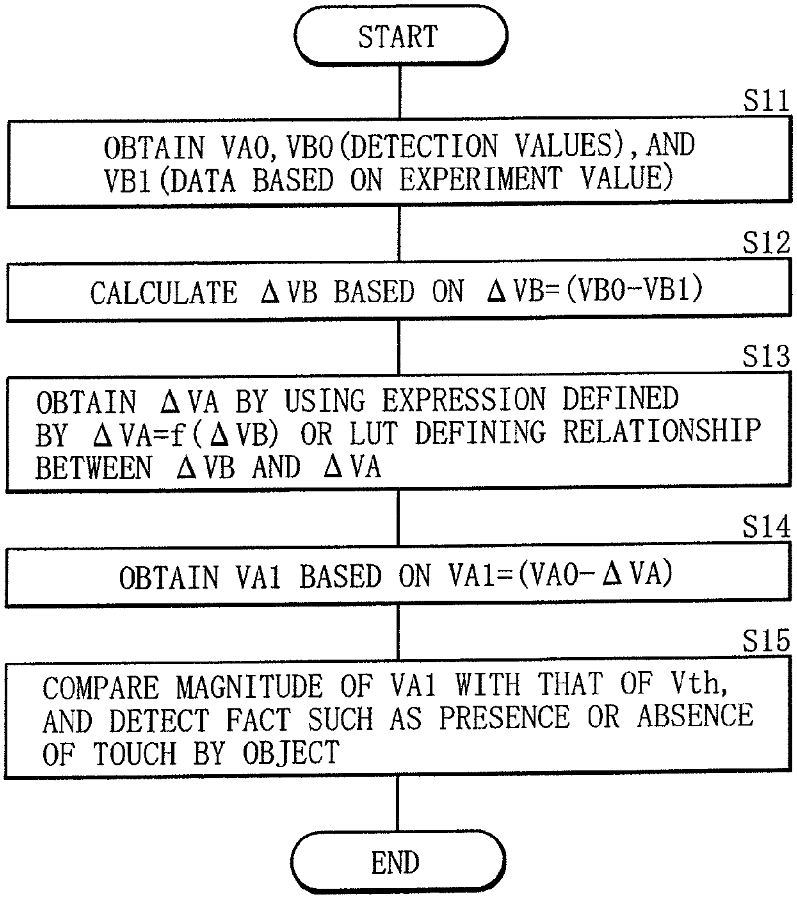
FIG. 12 is a flowchart that illustrates an example of the detection operation in the detection circuit illustrated in FIG. 6.

To begin with, in Method 1 illustrated in FIG. 12, at first, there are obtained: the electric potentials VA0 and VB0 (detection values) before and after the inversion, respectively, which are the electric potentials before the noise elimination; and the electric potential VB1 (data based on an experiment value) before the inversion, which is the electric potential after the noise elimination (step S11). Subsequently, based on the obtained electric potentials VB0 and VB1, there is determined, by using an operation expression defined by ΔVB=(VB0−VB1), a pre-inversion noise (potential difference) ΔVB that is included in the detection signal preceding the inversion as a result of the operation of writing the image signal which is performed before the inversion (step S12). Next, based on the determined pre-inversion noise ΔVB, a post-inversion noise (potential difference) ΔVA that corresponds to the post-inversion noise is determined (step S13). This post-inversion noise (potential difference) ΔVA is determined by using a predetermined operation expression defined by ΔVA=f(ΔVB) or a predetermined LUT (lookup table) that defines the relationship between ΔVB and ΔVA. Subsequently, by subtracting this post-inversion noise ΔVA from the electric potential VA0 obtained in step S11 (i.e. VA1=VA0−ΔVA), the electric potential VA1 of the noise-eliminated signal is obtained (step S14). And then, by comparing the magnitude of the electric potential VA1 of the noise-eliminated signal with that of a predetermined threshold voltage Vth, the detection operation following the inversion (detection of a fact such as the presence or absence of the touch by the object) is performed (step S15).

(Method 2)

Figure 13:
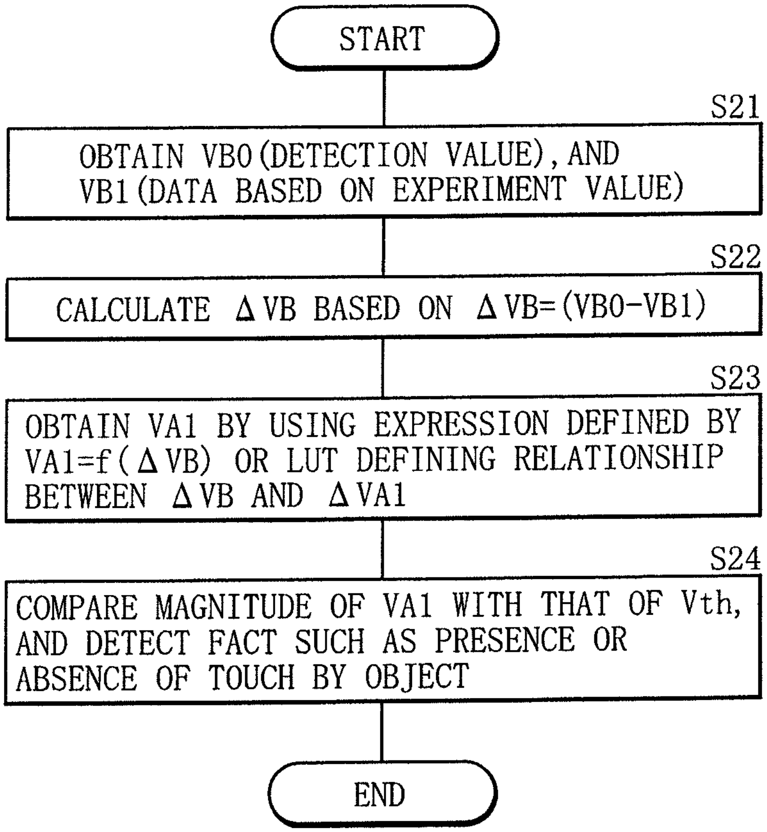
FIG. 13 is a flowchart that illustrates another example of the detection operation in the detection circuit illustrated in FIG. 6.

In Method 2 illustrated in FIG. 13, at first, there are obtained: the electric potential VB0 (detection value) preceding the inversion, which is the electric potential before the noise elimination; and the electric potential VB1 preceding the inversion, which is the electric potential after the noise elimination (step S21). Subsequently, based on the obtained electric potentials VB0 and VB1, by using an operation expression defined by ΔVB=(VB0−VB1), the pre-inversion noise (potential difference) ΔVB is determined (step S22). Next, based on the determined pre-inversion noise ΔVB, the electric potential VA1 of the noise-eliminated signal is determined (step S23). This electric potential VA1 of the noise-eliminated signal is determined by using a predetermined operation expression defined by VA1=f(ΔVB) or a predetermined LUT (lookup table) that defines the relationship between ΔVB and VA1. And then, by comparing the magnitude of the electric potential VA1 of the noise-eliminated signal with that of the predetermined threshold voltage Vth, the detection operation following the inversion (detection of the fact such as the presence or absence of the touch by the object) is performed (step S24).

(Method 3)

Figures 14, 15:
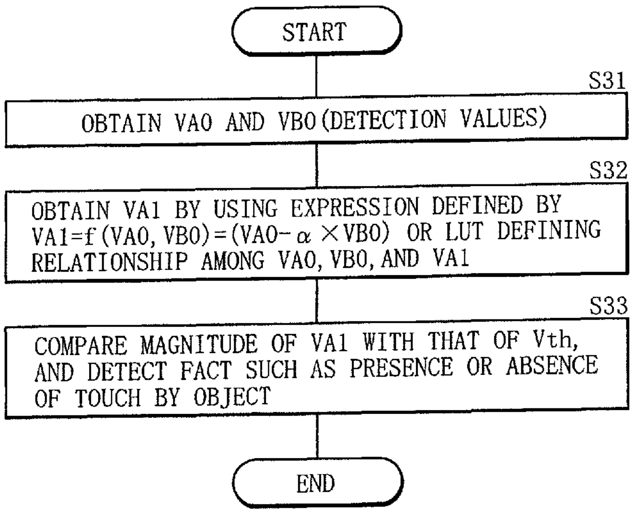
FIG. 14 is a flowchart that illustrates yet another example of the detection operation in the detection circuit illustrated in FIG. 6.
FIG. 15 is a table that indicates examples of the difference between the detection signal value in white writing and that in black writing, which varies depending on the detection method.

In Method 3 illustrated in FIG. 14, at first, there are obtained: the electric potential VA0 (detection value) after the inversion, which is the electric potential before the noise elimination; and the electric potential VB0 (detection value) before the inversion which is the electric potential before the noise elimination (step S31). Subsequently, based on the obtained electric potentials VA0 and VB0, the electric potential VA1 of the noise-eliminated signal is determined (step S32). This electric potential VA1 of the noise-eliminated signal is determined by using a predetermined operation expression defined by VA1=f(VA0, VB0)=(VA0−α×VB0), where α is a predetermined coefficient, or a predetermined LUT (lookup table) that defines the relationships among VA0, VB0, and VA1. And then, by comparing the magnitude of the electric potential VA1 of the noise-eliminated signal with that of the predetermined threshold voltage Vth, the detection operation following the inversion (detection of the fact such as the presence or absence of the touch by the object) is performed (step S33).

Here, FIG. 15 illustrates examples of the difference between the detection signal value at the time of white writing and that at the time of black writing, which varies depending on the detection method. As illustrated in FIG. 15, as compared to a detection result in the writing period ΔtB and a detection result in the writing period ΔtA, the detection result obtained by using the method of the present embodiment described so far is smaller in the difference between the detection signal value at the time of white writing and that at the time of black writing. Specifically, the difference between the detection signal values in the detection during the writing period ΔtB and that in the detection during the writing period ΔtA are 0.50V and 0.20V, respectively, whereas the difference between the detection signal values in the detection employing the method of the present embodiment is 0.01V.

As described above, in the present embodiment, the position touched by the object is detected based on the detection signal Vdet obtained from the touch detection electrode according to the change of the capacitor, and also the detection circuit 8 performs the detection operation in the inversion period following the inversion by using the detection signal Vdet preceding the inversion in the common drive signal Vcom. Therefore, it is possible to perform the detection operation in the inversion period following the inversion while eliminating the effect of the post-inversion noise, without using a shield layer like those used in the past. Accordingly, it is possible to improve the accuracy of the object detection in the display device having the capacitance type touch sensor, without using a shield layer.

[2. Second Embodiment]

Next, a second embodiment of the present invention will be described. The second embodiment differs from the above-described first embodiment in that a liquid crystal element in a lateral-electric-field mode is used as a display device.

[Example of the Configuration of a Display Device 1B]

Figure 16:
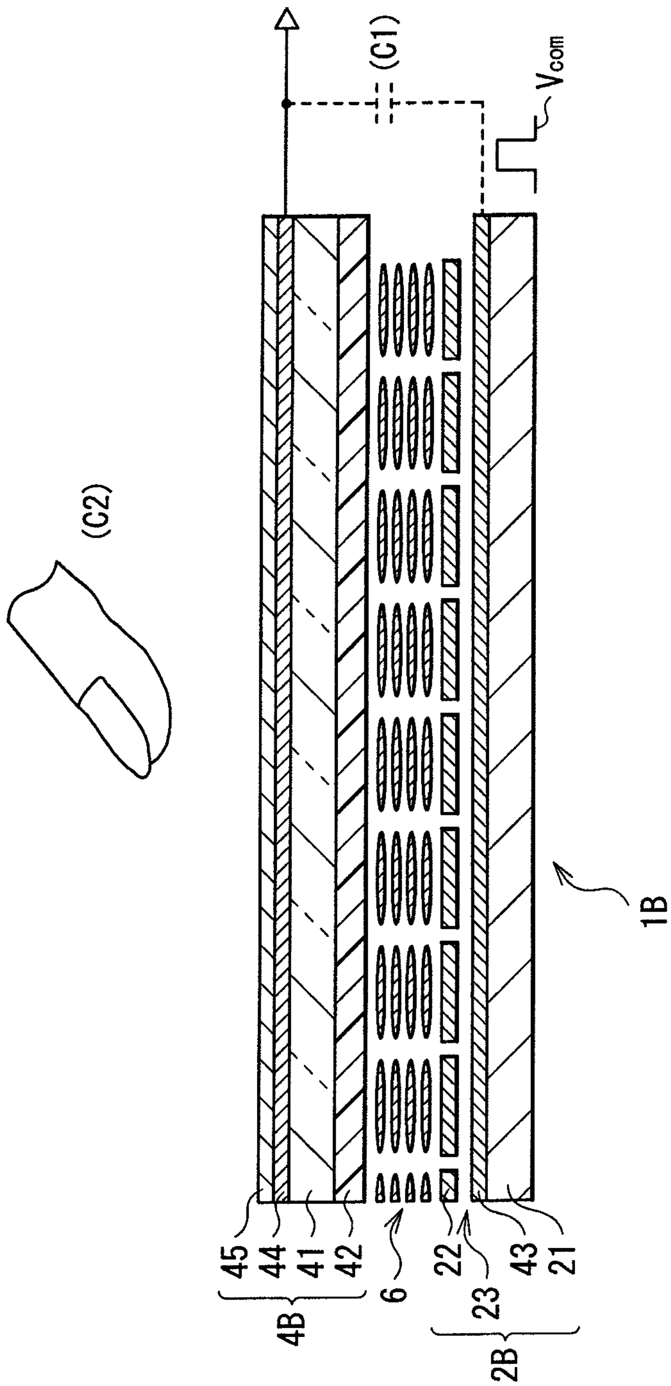
FIG. 16 is a cross-sectional diagram that schematically illustrates a configuration of a display device with a touch sensor according to a second embodiment of the present invention.
Figure 17B:
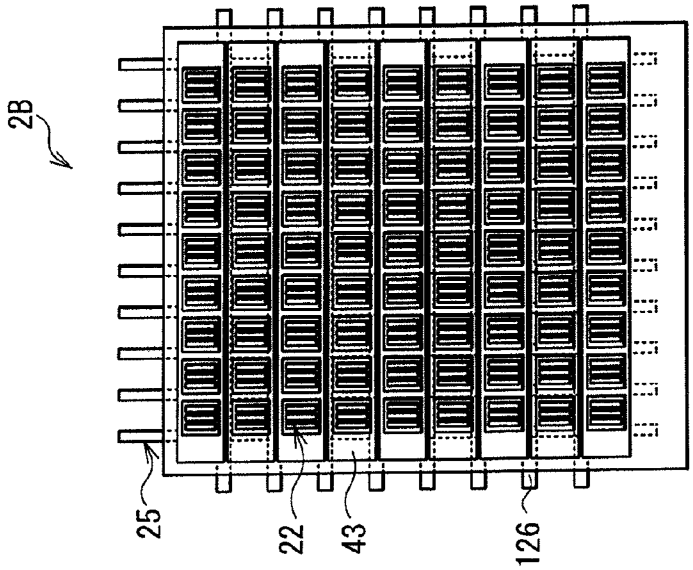
FIGS. 17A and 17B are a cross-sectional view and a plan view that illustrate details on a configuration of a part of a pixel substrate in the display device illustrated in FIG. 16, respectively.
Figure 17A:
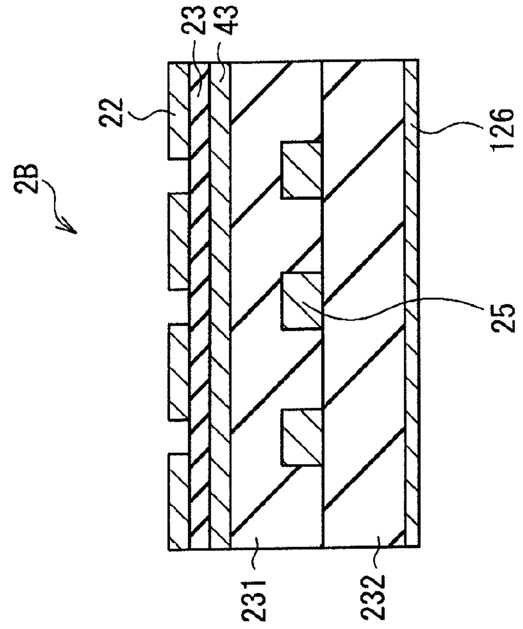
Figure 18A:
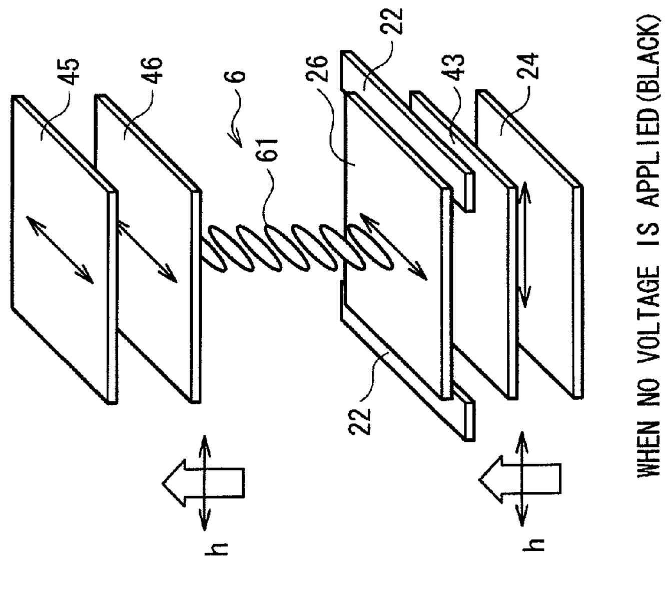
FIGS. 18A and 18B are enlarged perspective diagrams of a main part of the display device illustrated in FIG. 16.
Figure 18B:
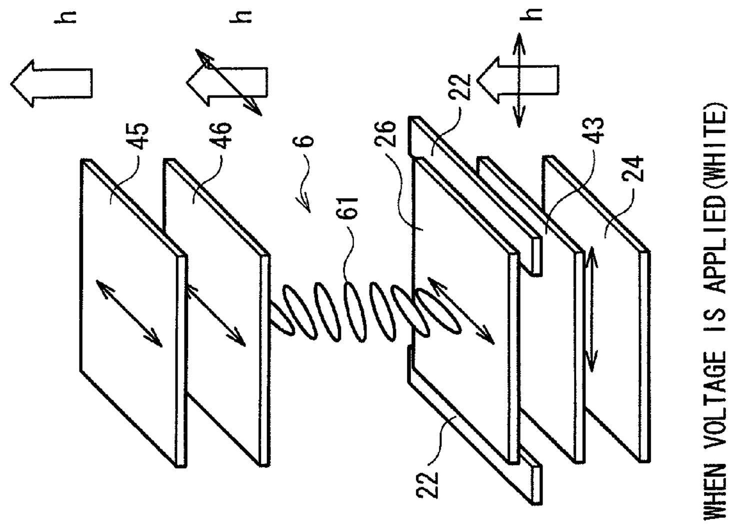

FIG. 16 illustrates a cross-sectional configuration of a main part of the display device 1B with a touch sensor according to the present embodiment. FIGS. 17A and 17B illustrate details on the configuration of a pixel substrate (pixel substrate 2B that will be described later) in the display device 1B. FIG. 17A is a cross sectional view of the configuration, while 17B is a plan view of the configuration. FIGS. 18A and 18B schematically illustrate the perspective configuration of the display device 1B. Incidentally, in these figures, the elements identical to those of the first embodiment are indicated by the same reference characters as those of the first embodiment, and some of the description of these elements will be omitted as appropriate.

The display device 1B includes a pixel substrate 2B, an opposed substrate 4B facing the pixel substrate 2B, and a liquid crystal layer 6 inserted between the pixel substrate 2B and the opposed substrate 4B.

The pixel substrate 2B includes a TFT substrate 21, a common electrode 43 disposed on the TFT substrate 21, and pixel electrodes 22 disposed in a matrix form on the common electrode 43 via an insulating layer 23. In addition to a display driver and TFTs, which are not illustrated, for driving each of the pixel electrodes 22, wirings such as a signal line (source line) 25 that supplies a pixel signal to each of the pixel electrodes 22 and a gate line 126 that drives each of the TFTs are formed in the TFT substrate 21 (FIGS. 17A and 17B). Moreover, in the TFT substrate 21, a detection circuit 8 (FIG. 6) that performs touch detection operation also is formed. The common electrode 43 is also used as a detection-electrode-for-sensor that forms a part of the touch sensor performing the touch detection operation. The common electrode 43 corresponds to the drive electrode E1 in FIG. 1A.

The opposed substrate 4B includes a glass substrate 41, a color filter 42 formed on one surface of the glass substrate 41. On the other surface of the glass substrate 41, a detection-electrode-for-sensor 44 is formed. Moreover, on this detection-electrode-for-sensor 44, a polarizing plate 45 is disposed. The detection-electrode-for-sensor 44 forms a part of the touch sensor, and corresponds to the detection electrode E2 in FIG. 1A. As illustrated in FIG. 5, the detection-electrode-for-sensor 44 is divided into the plurality of electrode patterns. The detection-electrode-for-sensor 44 may be directly formed on the opposed substrate 4B by a thin-film forming process, or may be indirectly formed on the opposed substrate 4B. In this case, the detection-electrode-for-sensor 44 may be formed on an unillustrated film substrate, and the film substrate on which the detection-electrode-for-sensor 44 is formed may be attached to a surface of the opposed substrate 4B. Further, in this case, the film substrate can be attached, not only between the glass substrate 41 and the polarizing plate 45, but also to a top surface of the polarizing plate 45. Furthermore, the detection-electrode-for-sensor 44 may be formed within a film that configures the polarizing plate 45.

A common drive signal Vcom having an AC rectangular waveform is applied from the TFT substrate 21 to the common electrode 43. The common drive signal Vcom defines a pixel voltage applied to the pixel electrode 22 as well as a display voltage of each of the pixels, and is also used as the drive signal for the touch sensor. The common drive signal Vcom corresponds to the AC rectangular wave Sg supplied from the drive signal source S in FIGS. 1A and 1B.

The liquid crystal layer 6 modulates light passing through the liquid crystal layer 6, and is configured of a liquid crystal in a lateral-electric-field mode such as FFS (fringe field switching) mode and IPS (in-plain switching) mode.

The configurations of the common electrode 43 in the pixel substrate 2B and the detection-electrode-for-sensor 44 are, for example, similar to those illustrated in FIG. 5. The common electrode 43 and the detection-electrode-for-sensor 44 are each formed as a plurality of electrode patterns, and the electrode patterns of the common electrode 43 and those of the detection-electrode-for-sensor 44 in the opposed substrate 4B are formed to extend while crossing each other.

Now, with reference to FIGS. 18A and 18B, more details will be described. In the liquid crystal element of FFS mode as indicated here, the pixel electrode 22 patterned in a comb shape is disposed on the common electrode 43 formed on the pixel substrate 2B, with the insulating layer 23 in between, and an alignment film 26 covering the pixel electrode 22 is formed. Between this alignment film 26 and an alignment film 46 on the opposed substrate 4B side, the liquid crystal layer 6 is supported. Two polarizing plates 24 and 45 are disposed in the state of cross-nichols. The rubbing direction of the two alignment films 26 and 46 corresponds to the transmission axis of one of the two polarizing plates 24 and 45. Here, the case where the rubbing direction corresponds to the transmission axis of the polarizing plate 45 on the light exit side is illustrated. Moreover, the rubbing direction of the two alignment films 26 and 46 and the direction of the transmission axis of the polarizing plate 45 are set approximately parallel to the extending direction (longitudinal direction of the comb) of the pixel electrode 22, in a range where the turning direction of the liquid crystal module is defined.

[Operation and Effect of the Display Device 1B]

Next, the operation and effect of the display device 1B according to the present embodiment will be described.

(Basic Operation)

Figure 19A:
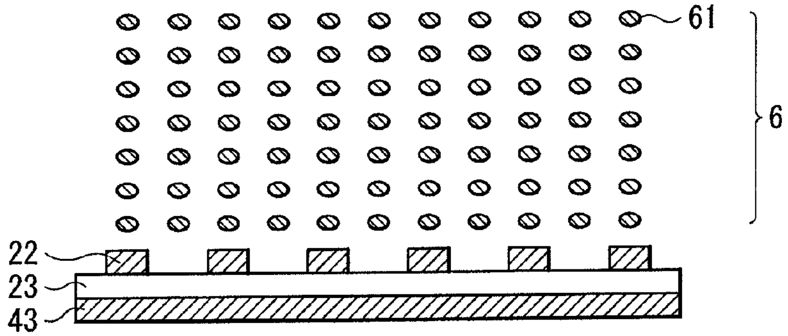
FIGS. 19A and 19B are cross-sectional diagrams for explaining an operation of the display device illustrated in FIG. 16.
Figure 19B:
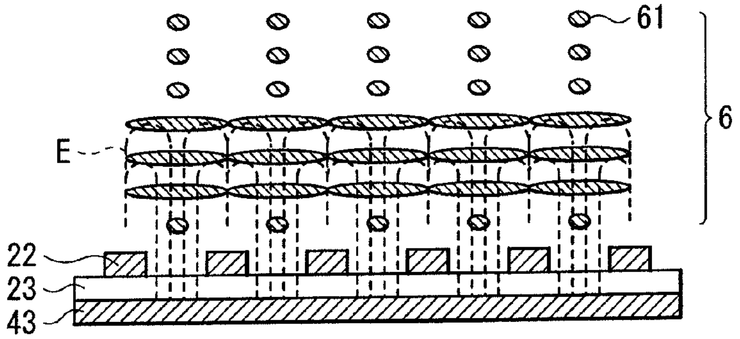

First, with reference to FIG. 18A through FIG. 19B, the display operation principle of the liquid crystal element in the FFS mode will be briefly described. FIGS. 19A and 19B illustrate enlarged cross-sections of the main part of the liquid crystal element. FIG. 18A and FIG. 19A illustrate a state of the liquid crystal element when no electric field is applied, while FIG. 19A and FIG. 19B illustrate a state of the liquid crystal element when the electric field is applied.

In the state where the voltage is not applied between the common electrode 43 and the pixel electrode 22 (FIG. 18A and FIG. 19A), the axis of liquid crystal molecules 61 of the liquid crystal layer 6 is orthogonal to the transmission axis of the polarizing plate 24 on the light incident side, and is parallel to the transmission axis of the polarizing plate 45 on the light exit side. For this reason, incident light "h" transmitting the polarizing plate 24 on the light incident side reaches the polarizing plate 45 on the light exit side, without causing a phase difference in the liquid crystal layer 6, and is absorbed in the polarizing plate 45, thereby black is displayed. On the other hand, in the state where the voltage is applied between the common electrode 43 and the pixel electrode 22 (FIG. 18B and FIG. 19B), the alignment direction of the liquid crystal molecules 61 is turned, in an oblique direction with respect to the extending direction of the pixel electrode 22, by a lateral electric field E generated between the pixel electrodes. At this moment, the electric field intensity when white is displayed is optimized so that the liquid crystal molecules 61 located approximately in the middle of the thickness direction of the liquid crystal layer 6 is turned about 45 degrees. Thereby, the phase difference is caused in the liquid crystal layer 6 while the incident light h transmits the liquid crystal layer 6, after transmitting the polarizing plate 24 on the light incident side. Thus, the incident light h becomes a straight-line polarized light which is turned 90 degrees, and transmits the polarizing plate 45 on the light exit side, thereby white is displayed.

Next, the display control operation and the touch detection operation of the display device 1B will be described. These operations are similar to those in the first embodiment described above and thus, some of the description will be omitted as appropriate.

The display driver (not illustrated in the figure) in the pixel substrate 2B line-sequentially supplies the common drive signal Vcom to each of the electrode patterns in the common electrode 43. The display driver also supplies the pixel signal to the pixel electrode 22 through the source line 25, and line-sequentially controls the switching of the TFT in each of the pixel electrodes via the gate line 126, in synchronization with the supply of the pixel signal. Thereby, the electric field is applied to the liquid crystal layer 6 for each of the pixels, in the lateral direction (direction parallel to the substrate) defined by the common drive signal Vcom and each of the pixel signals, so that the liquid crystal state is modulated. In this manner, the display is performed with the so-called inversion drive.

On the other hand, on the opposed substrate 4B side, the common drive signal Vcom is time-divisionally sequentially applied to each of the electrode patterns in the common electrode 43. Then, charge/discharge is performed on each of the capacitor elements C1 (C11 through C16) of one line formed at the intersection portion of the electrode pattern in the common electrode 43, to which the common drive voltage Vcom is applied, and each of the electrode patterns in the detection-electrode-for-sensor 44. The detection signal Vdet with the magnitude in accordance with the capacity of the capacitor element C1 is output from each of the electrode patterns in the detection-electrode-for-sensor 44. In the state in which the user's finger is not in contact with the surface of the opposed substrate 4B, the magnitude of this detection signal Vdet is approximately constant. When the user's finger touches any place on the surface of the opposed substrate 4B, the capacitor element C2 by the finger is added to the capacitor element C1 which is originally formed in the touched place. As a result, the value of the detection signal Vdet when that touched place is scanned becomes smaller than those in other places. The detection circuit 8 (FIG. 6) compares this detection signal Vdet with the threshold voltage Vth. When the detection signal Vdet is smaller than the threshold voltage Vth, the detection circuit 8 determines that place as the touched place. This touched place is determined based on the application timing of the common drive signal Vcom, and the detection timing of the detection signal Vdet which is smaller than the threshold voltage Vth.

As described above, according to the present embodiment, as in the case with the above-described first embodiment, the capacitance type touch sensor is configured such that the common electrode 43 which is originally provided in the liquid crystal display element is also used as one of the pair of electrodes for the touch sensor, including the drive electrode and the detection electrode, and the common drive signal Vcom serving as the drive signal for display is also used as the drive signal for the touch sensor. Therefore, only the detection-electrode-for-sensor 44 may be provided as a newly provided electrode and also, it is unnecessary to newly provide a drive signal for the touch sensor. Accordingly, the configuration is simple.

In the present embodiment as well, the detection circuit 8 described above for the first embodiment is provided and thus, it is possible to achieve similar effects by similar operation to those in the first embodiment. In other words, it is possible to improve the accuracy of the object detection in the display device with the capacitance type touch sensor, without using a shield layer.

In particular, in the present embodiment, since the common electrode 43 serving as the drive electrode for the touch sensor is arranged on the pixel substrate 2 side (on the TFT substrate 21), it is extremely easy to supply the common drive signal Vcom from the TFT substrate 21 to the common electrode 43. At the same time, it is possible to concentrate necessary circuits, electrode patterns, wirings and the like in the pixel substrate 2, thereby realizing circuit integration. Therefore, there is no need to provide a supply path (contact conductive pillar 7) for supplying the common drive signal Vcom from the pixel substrate 2 side to the opposed substrate 4 side, which is necessary in the first embodiment, and thus, the configuration is further simplified.

Incidentally, as described above, since the common electrode 43 serving as the drive electrode for the touch sensor is provided on the pixel substrate 2B side and at the same time, the source line 25 and the gate line 126 are provided on the pixel substrate 2B, the configuration of the present embodiment may be particularly susceptible to the effect of the post-inversion noise. For this reason, in the display device 1B of the present embodiment, an advantage resulting from the implementation of the detection operation by eliminating the effect of the post-inversion noise is particularly large.

Incidentally, although the detection circuit 8 (FIG. 6) may be formed in a peripheral region (a non-display region or a frame region) on the opposed substrate 4B, it is preferable to form the detection circuit 8 in a peripheral region on the pixel substrate 2B. When the detection circuit 8 is formed on the pixel substrate 2B, the detection circuit 8 and various circuit elements for display control and the like, which are originally formed on the pixel substrate 2, can be integrated.

[Modifications of the Second Embodiment]

In the present embodiment, the detection-electrode-for-sensor 44 is provided on the surface side (opposite to the side facing the liquid crystal layer 6) of the glass substrate 41. However, this may be modified as follows.

Figure 20:
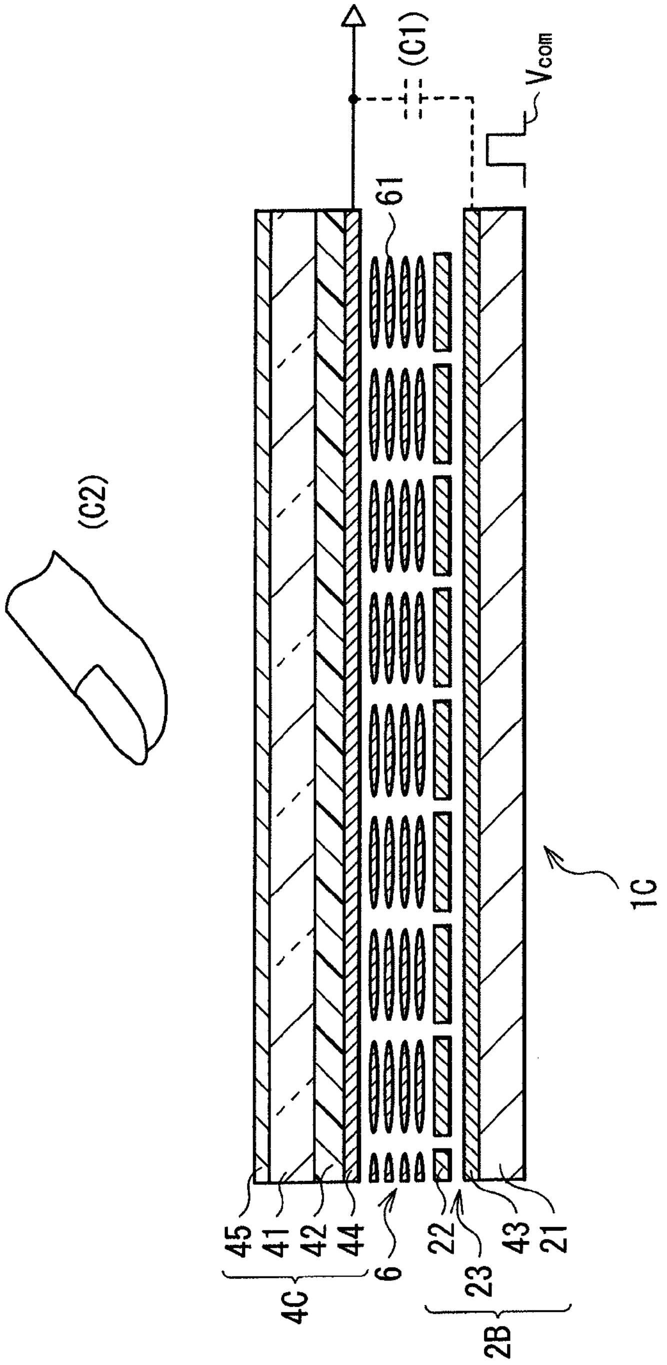
FIG. 20 is a cross-sectional diagram that schematically illustrates a configuration of a display device with a touch sensor according to a modification of the second embodiment.

For example, as depicted in a display device 1C illustrated in FIG. 20, the detection-electrode-for-sensor 44 may be provided on the liquid crystal layer 6 side, beyond the color filter 42, in an opposed substrate 4C.

Figure 21:
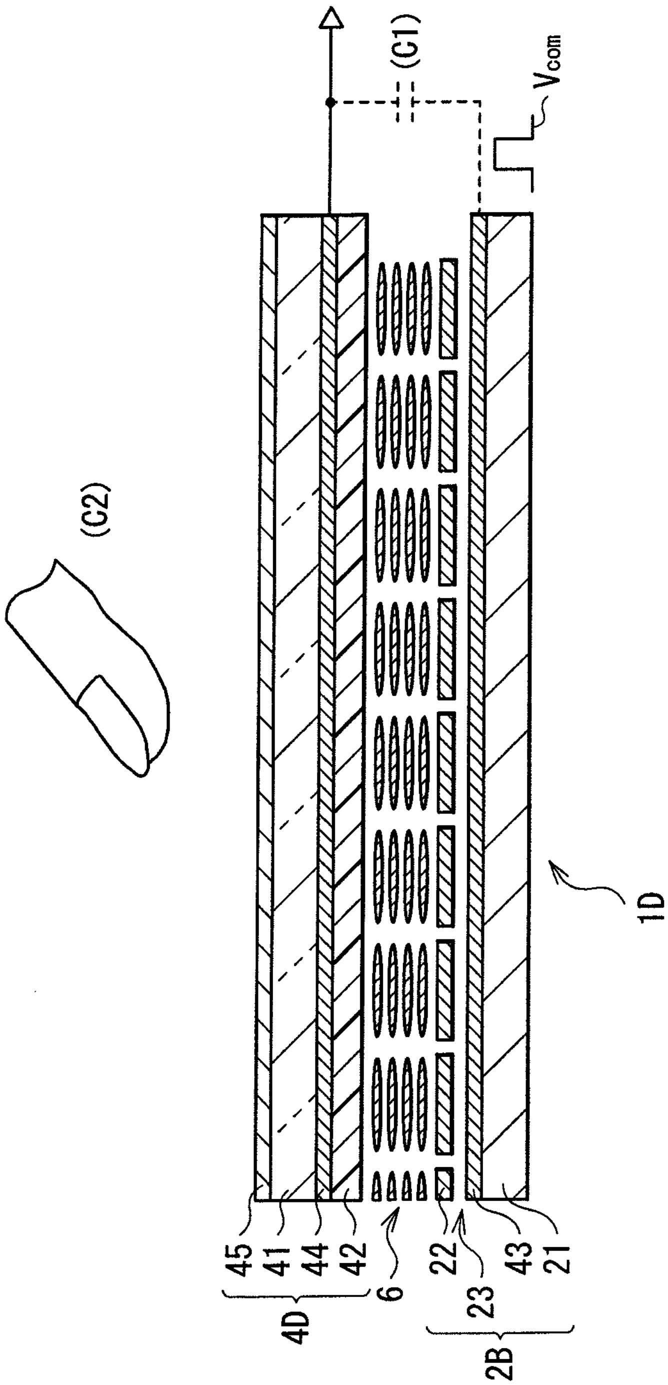
FIG. 21 is a cross-sectional diagram that schematically illustrates a configuration of a display device with a touch sensor according to another modification of the second embodiment.

Alternatively, as depicted in a display device 1D illustrated in FIG. 21, the detection-electrode-for-sensor 44 may be provided between the glass substrate 41 and the color filter 42, in an opposed substrate 4D. In the lateral-electric-field mode, when the electrode is present in the vertical direction, the electric field is applied in the vertical direction, and the view angle or the like may be highly deteriorated due to the rising of the liquid crystal. Therefore, as in the display device 1D, when the detection-electrode-for-sensor 44 is disposed so that a dielectric such as the color filter 42 is interposed between the liquid crystal layer 6 and the detection-electrode-for-sensor 44, this issue can be greatly eased.

[3. Modifications (Modifications 1 and 2)]

Next, Modifications 1 and 2 common to the first and second embodiments will be described. In the description of these embodiments, as illustrated in FIG. 5, each of the common electrode 43 and the detection-electrode-for-sensor 44 is formed as the plurality of the electrode patterns, and the electrode patterns of the common electrode 43 and those of the detection-electrode-for-sensor 44 are formed to extend while crossing each other. However, the configurations of the common electrode 43 and the detection-electrode-for-sensor 44 are not limited to this example. Incidentally, in the following description, elements identical to those of the first and second embodiments are indicated by the same reference characters as those of the first and second embodiments, and some of the description of these elements will be omitted as appropriate.

(Modification 1)

Figure 22:
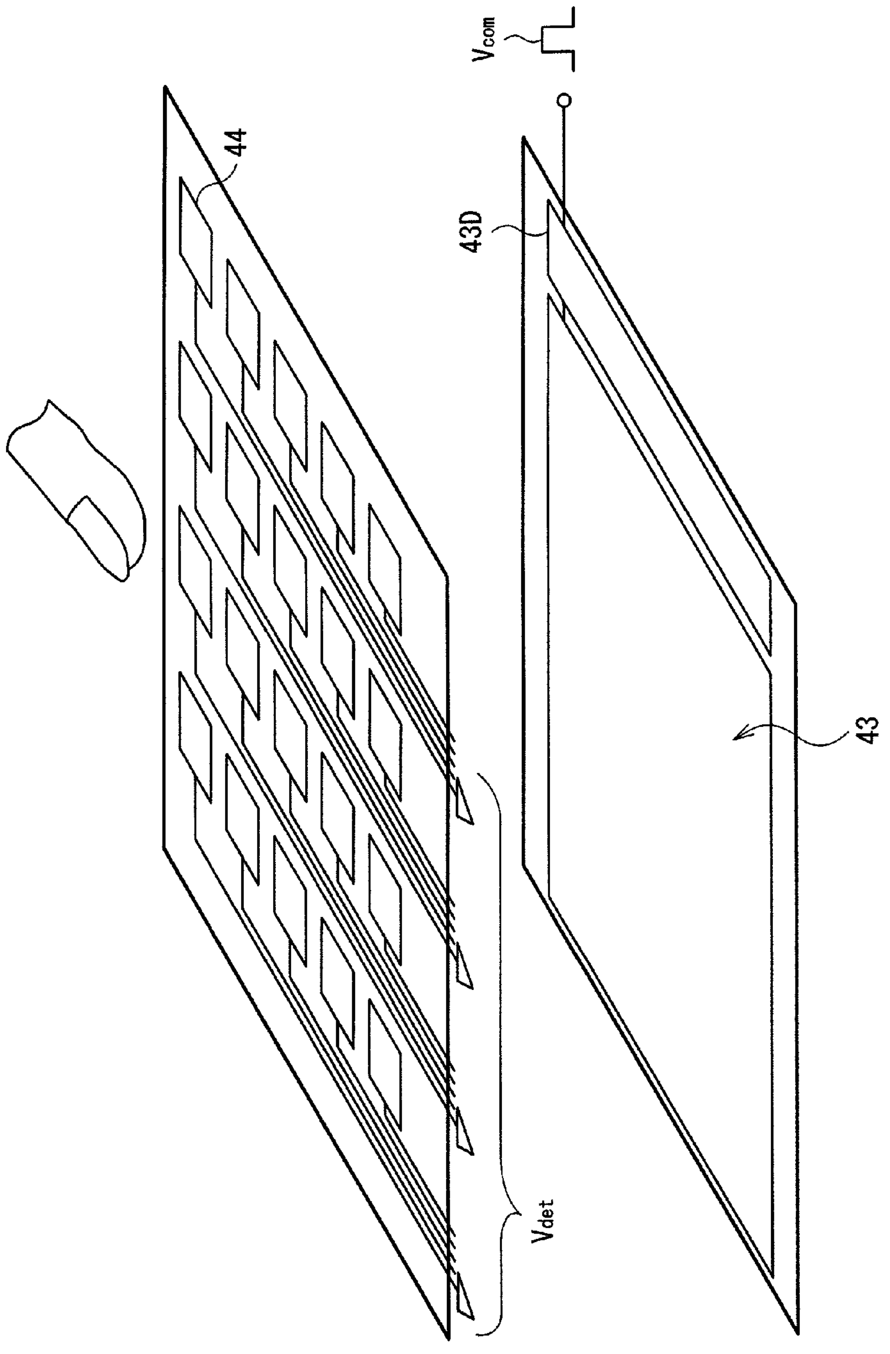
FIG. 22 is a perspective diagram that illustrates a configuration of a main part (a common electrode and a detection-electrode-for-sensor) of a display device with a touch sensor according to Modification 1 of the present invention.

FIG. 22 is a perspective diagram that illustrates the configuration of a main part (common electrode and detection-electrode-for-sensor) of a display device with a touch sensor according to Modification 1. As illustrated in FIG. 22, the common electrode 43 may be formed as a single solid electrode, and at the same time, the detection-electrode-for-sensor 44 may be formed as a plurality of individual electrodes arranged in a matrix form. In this case, it is possible to immediately identify a touched position based on the detection signal Vdet from each of the individual electrodes configuring the detection-electrode-for-sensor 44.

(Modification 2)

Figure 23:
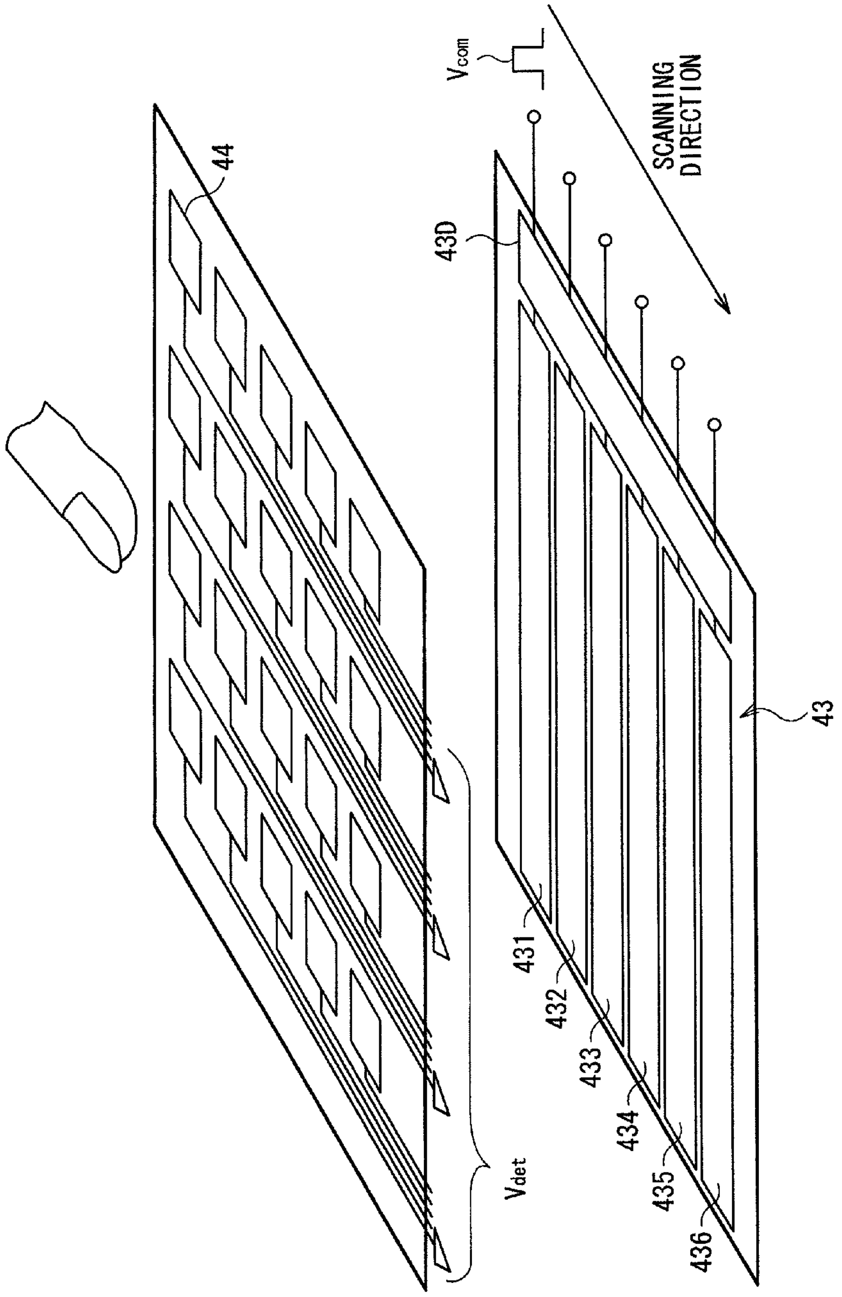
FIG. 23 is a perspective diagram that illustrates a configuration of a main part (a common electrode and a detection-electrode-for-sensor) of a display device with a touch sensor according to Modification 2 of the present invention.

FIG. 23 is a perspective diagram that illustrates the configuration of a main part (common electrode and detection-electrode-for-sensor) of a display device with a touch sensor according to Modification 2. As illustrated in FIG. 23, the common electrode 43 may be formed as a plurality of stripe-shaped electrode patterns like those in FIG. 5, while the detection-electrode-for-sensor 44 may be formed as a plurality of individual electrodes arranged in a matrix form like those in FIG. 22. In this case as well, it is possible to perform the detection while sequentially scanning the plurality of electrode patterns of the common electrode 43 with the common drive signal Vcom.

4. Application Examples

Now, with reference to FIG. 24 through FIG. 28G there will be described application examples of the display device with the touch sensor described above in the first and second embodiments and the modifications. The display device according to any of the above-described embodiments and the like can be applied to electronic units in all fields, such as television receivers, digital cameras, laptop computers, portable terminal devices such as portable telephones, and video cameras. In other words, the display device according to any of the above-described embodiments and the like can be applied to electronic units in all fields, which display externally input or internally produced video signals as a still or moving image.

Application Example 1

FIG. 24 is an external view of a television receiver to which the display device according to any of the above-described embodiments and the like is applied. This television receiver has, for example, a video display screen section 510 that includes a front panel 511 and a filter glass 512. The video display screen section 510 is configured by using the display device according to any of the above-described embodiments and the like.

Application Example 2

FIGS. 25A and 25B are external views of a digital camera to which the display device according to any of the above-described embodiments and the like is applied. This digital camera includes, for example, a flash emitting section 521, a display section 522, a menu switch 523, and a shutter release 524. The display section 522 is configured by using the display device according to any of the above-described embodiments and the like.

Application Example 3

Figure 26:
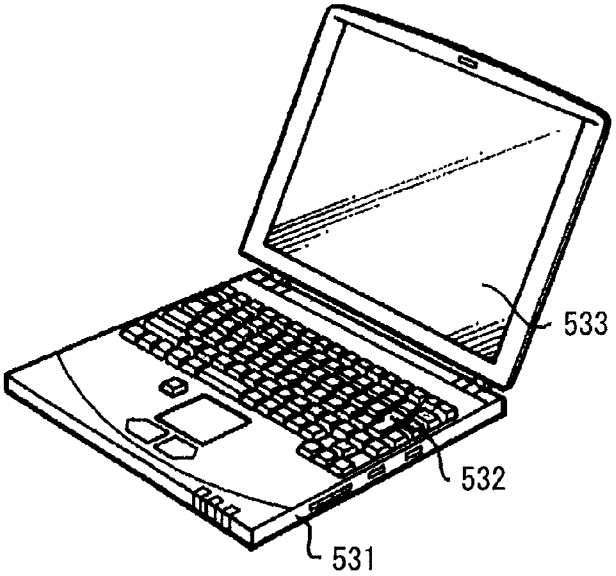
FIG. 26 is a perspective external view of Application example 3.

FIG. 26 is an external view of a laptop computer to which the display device according to any of the above-described embodiments and the like is applied. This laptop computer includes, for example, a main section 531, a keyboard 532 used to enter characters and the like, and a display section 533 that displays an image. The display section 533 is configured by using the display device according to any of the above-described embodiments and the like.

Application Example 4

Figure 27:
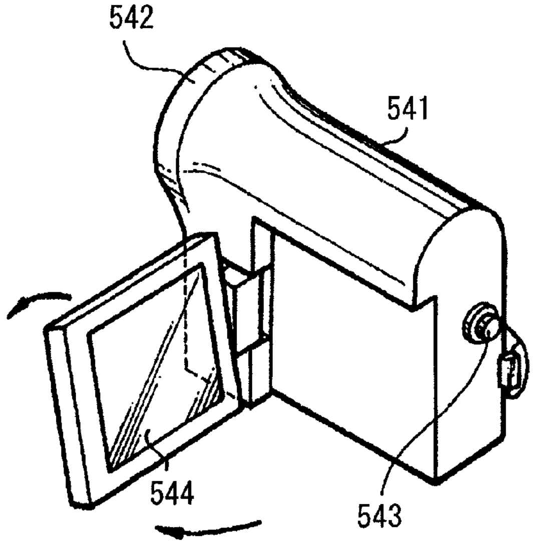
FIG. 27 is a perspective external view of Application example 4.
Figure 28E:
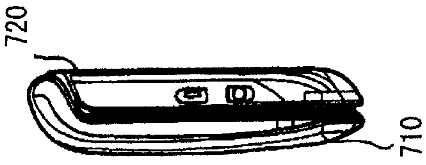
FIGS. 28A through 28G are a front view, a side view, a front view in a closed state, a left-side view, a right-side view, a top view, and a bottom view of Application example 5, respectively.
Figure 28F:
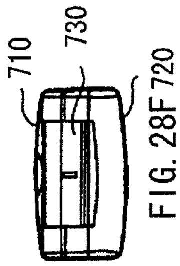
Figure 28C:
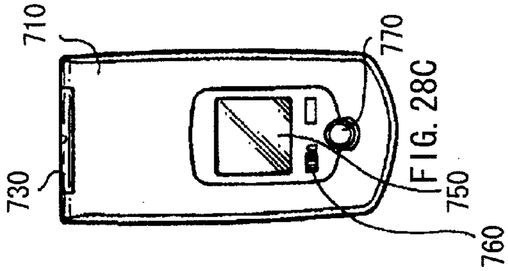
Figure 28G:
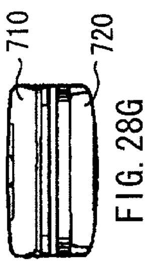
Figure 28D:
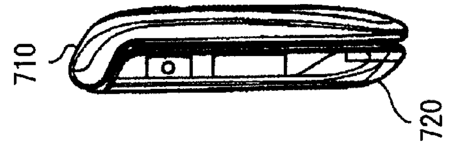
Figure 28B:
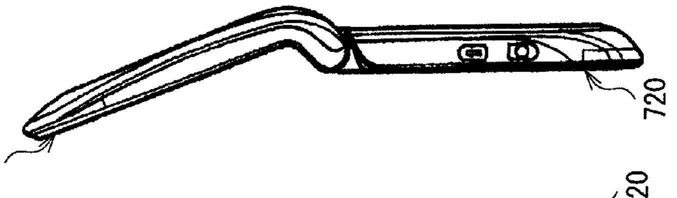
Figure 28A:
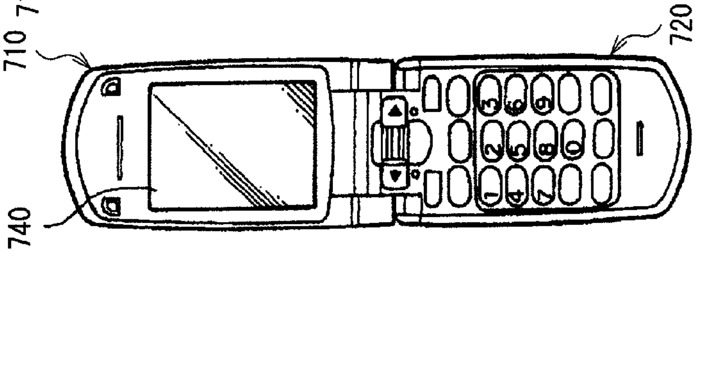

FIG. 27 is an external view of a video camera to which the display device according to any of the above-described embodiments and the like is applied. This video camera includes, for example, a main section 541, a lens 542 disposed on a front face of the main unit 541 to shoot an image of a subject, a start/stop switch 543 used at the time of shooting, and a display section 544. The display section 544 is configured by using the display device according to any of the above-described embodiments and the like.

Application Example 5

FIGS. 28A through 28G are external views of a portable telephone to which the display device according to any of the above-described embodiments and the like is applied. This portable telephone includes, for example, an upper housing 710, a lower housing 720, a coupling section (hinge section) 730 that couples the upper and lower housings 710 and 720 to each other, a display 740, a sub-display 750, a picture light 760, and a camera 770. The display 740 or sub-display 750 is configured by using the display device according to any of the above-described embodiments and the like.

(Other Modifications)

The present invention has been described with reference to the first and second embodiments, modification and application examples. However, the present invention is not limited to these embodiments and the like and may be variously modified.

For example, it is conceivable that the amount of noise caused by the image writing as described above in the embodiments and the like may vary depending on the position on the display device (touch sensor). Therefore, in order to deal with the position dependence of the amount of noise, it is preferable to prepare, for each of a plurality of areas, the operation expression or lookup table mentioned above in the description of the embodiments and the like.

Further, the second embodiment has been described by taking the liquid crystal element in FFS mode as an example of use of the lateral-electric-field mode. However, a liquid crystal in IPS mode may be similarly employed.

Furthermore, in the above-described embodiments and the like, there has been described the display device that employs the liquid crystal element as a display element. However, the above-described embodiments and the like may be applied to a display device that uses other type of display element such as an organic electro luminescence element.

In addition, in the above-described embodiments and the like, there has been described the case where the touch sensor is mounted inside the display device. However, the present invention may be applied to, for example, a case where the touch sensor is of an external type and mounted outside the display device.

Moreover, any of the series of processes in the above-described embodiments and the like may be performed by not only hardware but software. When the series of processes is performed by software, a program of the software is installed on a general-purpose computer or the like. Such a program may be recorded beforehand in a recording medium built in the computer.

The present application contains subject matter related to that disclosed in Japanese Priority Patent Application JP 2009-120222 filed in the Japan Patent Office on May 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a plurality of display pixel electrodes;

a common electrode facing the display pixel electrodes;

a display function layer having an image display function;

a display control circuit performing image display control by applying a pixel voltage to each of the display pixel electrodes and applying a common drive voltage periodically to the common electrode, the common drive voltage inverting in synchronization with a drive cycle of the image display control;

a touch detection electrode having a capacitance with the common electrode; and a touch detection circuit performing a detection operation of detecting an external proximity object, based on a detection signal obtained from the touch detection electrode, wherein the touch detection circuit performs the detection operation in a period of time following an inversion timing of the common drive voltage and only during a time preceding an image-signal writing operation, based on both a first detection signal obtained during a time after another image-signal writing operation and before the inversion timing, and a second detection signal obtained after the inversion timing and before an image-signal writing operation;

a first noise-eliminated detection signal is obtained by subtracting a predetermined first value from the first detection signal, a second noise-eliminated detection signal is obtained by subtracting a predetermined second value from the second detection signal; and the touch detection circuit performing the detection operation to detect the external proximity object by comparing the first noise-eliminated detection signal and a predetermined threshold value, and further wherein the first noise-eliminated detection signal is a pre-inversion noise eliminated detection signal and the second noise-eliminated detection signal is a post-inversion noise eliminated detection signal and the first and second predetermined values are different from each other.

2. The display device according to claim 1, wherein the touch detection circuit obtains a noise-eliminated detection signal through eliminating the post-inversion noise from the second detection signal, the post-inversion noise being caused by the image-signal writing operation for image display before the inversion timing and affecting the second detection signal, and then the touch detection circuit performs the detection operation in the inversion period following the inversion timing with use of the noise-eliminated detection signal.

3. The display device according to claim 2, wherein the touch detection circuit determines the pre-inversion noise, which is caused by the image-signal writing operation for image display before the inversion timing and affects the first detection signal, and then the touch detection circuit obtains the noise-eliminated detection signal based on the determined pre-inversion noise.

4. The display device according to claim 3, wherein the touch detection circuit determines the post-inversion noise based on the pre-inversion noise, and the touch detection circuit obtains the noise-eliminated detection signal by subtracting the determined post-inversion noise from the second detection signal.

5. The display device according to claim 1, wherein the touch detection circuit obtains the first detection signal at a timing immediately before the inversion timing.

6. The display device according to claim 1, wherein the touch detection circuit performs the detection operation at timing preceding the image-signal writing operation for image display, in the inversion period following the inversion timing.

7. The display device according to claim 1, further comprising:

a circuit substrate with the display control circuit therein; and an opposed substrate facing the circuit substrate, wherein the display pixel electrodes are disposed on a side close to the opposed substrate, on the circuit substrate, the common electrode is disposed on a side close to the circuit substrate, on the opposed substrate, and the display function layer is disposed to be inserted between the display pixel electrode on the circuit substrate and the common electrode on the opposed substrate.

8. The display device according to claim 7, wherein the display function layer is a liquid crystal layer.

9. The display device according to claim 1, further comprising:

a circuit substrate with the display control circuit therein; and an opposed substrate facing the circuit substrate, wherein the common electrode and the display pixel electrode are stacked in order, with an insulating layer in between, on the circuit substrate, and the display function layer is disposed to be inserted between the display pixel electrode on the circuit substrate and the opposed substrate.

10. The display device according to claim 9, wherein the display function layer is a liquid crystal layer which operates in a lateral-electric-field mode.

11. The display device according to claim 1, wherein the touch detection electrode is divided into a plurality of stripe-shaped electrode patterns.

12. The display device according to claim 11, wherein the display control circuit drives the plurality of electrode patterns in such a manner that a group of electrode patterns selected from the plurality of electrode patterns are driven at a time, selection of the group being sequentially shifted.

13. The display device according to claim 1, wherein the first detection signal is obtained from the detection electrode that is excited by the common electrode with a common drive voltage and the common drive voltage inverts in synchronization with a drive cycle of the image display.

14. An electronic unit comprising a display device with a touch sensor, the display device including:

a plurality of display pixel electrodes;

a common electrode facing the display pixel electrodes;

a display function layer having an image display function;

a display control circuit performing image display control by applying a pixel voltage to each of the display pixel electrodes and applying a common drive voltage to the common electrode, the common drive voltage periodically inverting in synchronization with a drive cycle of the image display control;

a touch detection electrode having a capacitance with the common electrode; and a touch detection circuit performing a detection operation of detecting an external proximity object, based on a detection signal obtained from the touch detection electrode, wherein the touch detection circuit performs the detection operation in a period of time following an inversion timing of the common drive voltage and only during a time preceding an image-signal writing operation, based on both a first detection signal obtained before the inversion timing and a second detection signal obtained after the inversion timing;

a first noise-eliminated detection signal is obtained by subtracting a predetermined first value from the first detection signal, a second noise-eliminated detection signal is obtained by subtracting a predetermined second value from the second detection signal; and the touch detection circuit performing the detection operation to detect the external proximity object by comparing the first noise-eliminated detection signal, the second noise-eliminated detection signal and a predetermined threshold value, and further wherein the first noise-eliminated detection signal is a pre-inversion noise eliminated detection signal and the second noise-eliminated detection signal is a post-inversion noise eliminated detection signal and the first and second predetermined values are different from each other.

* * * * *